US011609675B2

(12) United States Patent
Murphy et al.

(10) Patent No.: US 11,609,675 B2
(45) Date of Patent: Mar. 21, 2023

(54) PLACEMENT OF OBJECTS IN AN AUGMENTED REALITY ENVIRONMENT

(71) Applicant: Google LLC, Mountain View, CA (US)

(72) Inventors: David Joseph Murphy, San Francisco, CA (US); Ariel Sachter-Zeltzer, Sunnyvale, CA (US); Caroline Hermans, New Preston, CT (US)

(73) Assignee: Google LLC, Mountain View, CA (US)

( * ) Notice: Subject to any disclaimer, the term of this patent is extended or adjusted under 35 U.S.C. 154(b) by 15 days.

(21) Appl. No.: 16/700,359

(22) Filed: Dec. 2, 2019

(65) Prior Publication Data

US 2020/0201514 A1 Jun. 25, 2020

Related U.S. Application Data

(60) Provisional application No. 62/781,810, filed on Dec. 19, 2018.

(51) Int. Cl.
*G06F 3/04815* (2022.01)
*G06F 3/16* (2006.01)
*G06T 19/00* (2011.01)

(52) U.S. Cl.
CPC .......... *G06F 3/04815* (2013.01); *G06F 3/167* (2013.01); *G06T 19/006* (2013.01)

(58) Field of Classification Search
CPC .......... G06T 19/006; G06T 2219/2004; G06T 17/005; G06F 3/04815; G06F 3/167; G06F 16/74; G06F 2206/1008
See application file for complete search history.

(56) References Cited

U.S. PATENT DOCUMENTS

| 9,338,589 | B2 | 5/2016 | Loxam et al. | |
| 2012/0086727 | A1* | 4/2012 | Korah | G06F 3/03 345/633 |
| 2013/0275918 | A1* | 10/2013 | Antonini | G06F 3/0482 715/841 |

(Continued)

OTHER PUBLICATIONS

Gal, FLARE Fast Layout for Augmented Reality Applications, URL: https://www.researchgate.net/publication/264760898—2014, pp. 7 (Year: 2014).*

(Continued)

*Primary Examiner* — Phuc N Doan
(74) *Attorney, Agent, or Firm* — Brake Hughes Bellermann LLP

(57) ABSTRACT

A system and method may include receiving data defining an augmented reality (AR) environment including a representation of a physical environment, identifying relationships between a plurality of scene elements in the AR environment, and obtaining a set of UI layout patterns for arranging the plurality of scene elements in the AR environment according to one or more relationships between the plurality of scene elements. The system and method may identify, for the at least one scene element, at least one relationship that corresponds to at least one UI layout pattern, generate a modified UI layout pattern for the at least one scene element using different relationships than the identified at least one relationship, and trigger display of the AR content associated with the information and the at least one scene element using the modified UI layout pattern.

19 Claims, 16 Drawing Sheets

(56) References Cited

U.S. PATENT DOCUMENTS

| | | | | |
|---|---|---|---|---|
| 2014/0200863 | A1* | 7/2014 | Kamat | G06T 19/00 |
| | | | | 703/1 |
| 2014/0372944 | A1* | 12/2014 | Mulcahy | G06F 3/0487 |
| | | | | 715/810 |
| 2015/0356774 | A1* | 12/2015 | Gal | G06T 19/20 |
| | | | | 345/633 |
| 2015/0356783 | A1* | 12/2015 | Miller | G06Q 30/02 |
| | | | | 345/633 |
| 2018/0089905 | A1* | 3/2018 | Solenthaler | G06F 16/954 |
| 2018/0350099 | A1* | 12/2018 | Yerkes | G06T 19/20 |
| 2018/0365898 | A1* | 12/2018 | Costa | G06F 3/038 |
| 2020/0242201 | A1* | 7/2020 | Lafreniere | G06T 19/006 |

OTHER PUBLICATIONS

Montero, Designing and implementing interactive and realistic augmented, Univ Access Inf Soc (2019) 18:49-61, URL: https://doi.org/10.1007/s10209-017-0584-2 (Year: 2019).*

Krishnaswami, A Semantic Model for Graphical User Interfaces, icfp 11 (Year: 2011).*

Echtler et al., Using Spatial Relationship Graphs Instead of Scene Graphs in Augmented Reality, 2008, pp. 4 (Year: 2008).*

* cited by examiner

PLACEMENT OF OBJECTS IN AN AUGMENTED REALITY ENVIRONMENT

CROSS REFERENCE TO RELATED APPLICATION

This application claims the benefit of U.S. Provisional Application No. 62/781,810, filed on Dec. 19, 2018, entitled "PLACEMENT OF OBJECTS IN AN AUGMENTED REALITY ENVIRONMENT," the disclosure of which is incorporated herein by reference in its entirety.

TECHNICAL FIELD

This document relates, generally, to rendering of computer-generated objects in an augmented reality (AR) environment. More specifically, this document relates to approaches for placement and manipulation of user interface (UI) content (e.g., AR objects) in an AR environment.

BACKGROUND

In the context of computer-based consumption of media and other content, it is becoming increasingly common to provide a user (viewer, participant, etc.) with immersive experiences. One field involves the presentation of virtual reality (VR) and/or augmented reality (AR) environments on a device, such as a smartphone or a tablet. In an AR environment, a person can watch a screen that presents at least both an aspect of a physical environment (e.g., a video or real-time image of a physical space) and an aspect of VR (e.g., a virtual object superimposed on the video or image) to provide an AR experience.

SUMMARY

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. Implementations of the described techniques may include hardware, a method or process, or computer software on a computer-accessible medium.

In a first general aspect, a method is described that may include receiving, by a computing device, data defining an augmented reality (AR) environment including a representation of a physical environment, identifying, by the computing device, relationships between a plurality of scene elements in the AR environment, and obtaining, by the computing device, a set of UI layout patterns for arranging the plurality of scene elements in the AR environment according to one or more relationships between the plurality of scene elements. In response to receiving an indication to retrieve AR content that is associated with at least one scene element in the plurality of scene elements and that is associated with retrieved information about at least one real-world object depicted in the AR environment, the method may include identifying, for the at least one scene element, at least one relationship, in the relationships between the plurality of scene elements, that corresponds to at least one UI layout pattern, generating a modified UI layout pattern for the at least one scene element using different relationships than the identified at least one relationship based on determining that a context corresponding to the at least one scene element is associated with the different relationships, and triggering, by the computing device, display of the AR content associated with the information and the at least one scene element using the modified UI layout pattern.

Implementations may include one or more of the following features. The method as recited above in which, the context corresponding to the at least one scene element is determined based on a user accessing the AR environment, based on a device used to access the AR environment, or based on the AR environment. In some implementations, the indication to retrieve the AR content associated with the at least one scene element is triggered by an audio cue received from a user accessing the AR environment, the audio cue indicating that the at least one scene element is interactive. In some implementations, the relationships between the plurality of scene elements are represented in a semantic graph and the semantic graph includes a plurality of multi-dimensional nodes and edges, each node in the semantic graph represents at least one scene element, and each edge between two or more nodes represents one or more relationships between the plurality of scene elements.

In some implementations, the method also includes updating the semantic graph to include the modified UI layout pattern for the at least one scene element in response to determining that a context corresponding to the at least one scene element is associated with different relationships. In some implementations, the method also includes adding an additional node corresponding to an additional scene element to be represented in the semantic graph and adding at least one additional edge from the additional node to another node of the semantic graph, wherein the additional edge represents a new relationship between the additional node and the other node of the semantic graph, in response to identifying additional AR content for display in the AR environment, In some implementations, the method also includes providing, by the computing device, the AR content according to a UI layout pattern generated to arrange the AR content in the AR environment on the additional scene element and according to the new relationship represented in the semantic graph.

In some implementations, the method also includes retrieving the information about the at least one real-world object depicted within the AR environment is retrieved in response to the computing device recognizing the at least one real-world object, the information being retrieved from online sources based on a captured image of the real-world object and in some implementations the indication to retrieve the information about the at least one real-world object is based on a triggered indicator provided in the AR environment. The indicator may provide functionality to access the information based on a UI layout pattern associated with the semantic graph. In some implementations, the at least one scene element is three-dimensional and configured to present three-dimensional AR content in the AR environment. In some implementations, each relationship indicates at least a placement indication and a scale indication for a corresponding scene element. In some implementations, the relationships between the plurality of scene elements each indicate at least one opinion for associating a UI layout pattern with a scene element. In some implementations, the display of the plurality of scene elements in the AR environment is based at least in part on the opinions. Implementations of the described techniques may include hardware, a method or process, or computer software on a computer-accessible medium.

In a second general aspect, a system is described including memory and at least one processor coupled to the memory, the at least one processor being configured to receive, by a computing device, data defining an augmented reality (AR) environment including a representation of a physical environment, identify, by the computing device, relationships between a plurality of scene elements in the AR environment, obtain, by the computing device, a set of UI layout patterns for arranging the plurality of scene elements in the AR environment according to one or more relationships between the plurality of scene elements, identify, for at least one scene element, at least one relationship, in the relationships between the plurality of scene elements, that corresponds to at least one UI layout pattern. The system may also generate a modified UI layout pattern for the at least one scene element using different relationships than the identified at least one relationship based on determining that a context corresponding to the at least one scene element is associated with different relationships and trigger, by the computing device, display of the AR content associated with the information and the at least one scene element using the modified UI layout pattern.

In some implementations, each relationship indicates at least a placement indication and a scale indication for a corresponding scene element. In some implementations, the relationships between the plurality of scene elements each indicate at least one opinion for associating a UI layout pattern with a scene element. In some implementations, the display of the plurality of scene elements in the AR environment is based at least in part on the opinions. Implementations of the described techniques may include hardware, a method or process, or computer software on a computer-accessible medium.

The details of one or more implementations are set forth in the accompanying drawings and the description below. Other features will be apparent from the description and drawings, and from the claims.

BRIEF DESCRIPTION OF DRAWINGS

Like reference symbols in the various drawings indicate like elements.

DETAILED DESCRIPTION

Figure 1A:
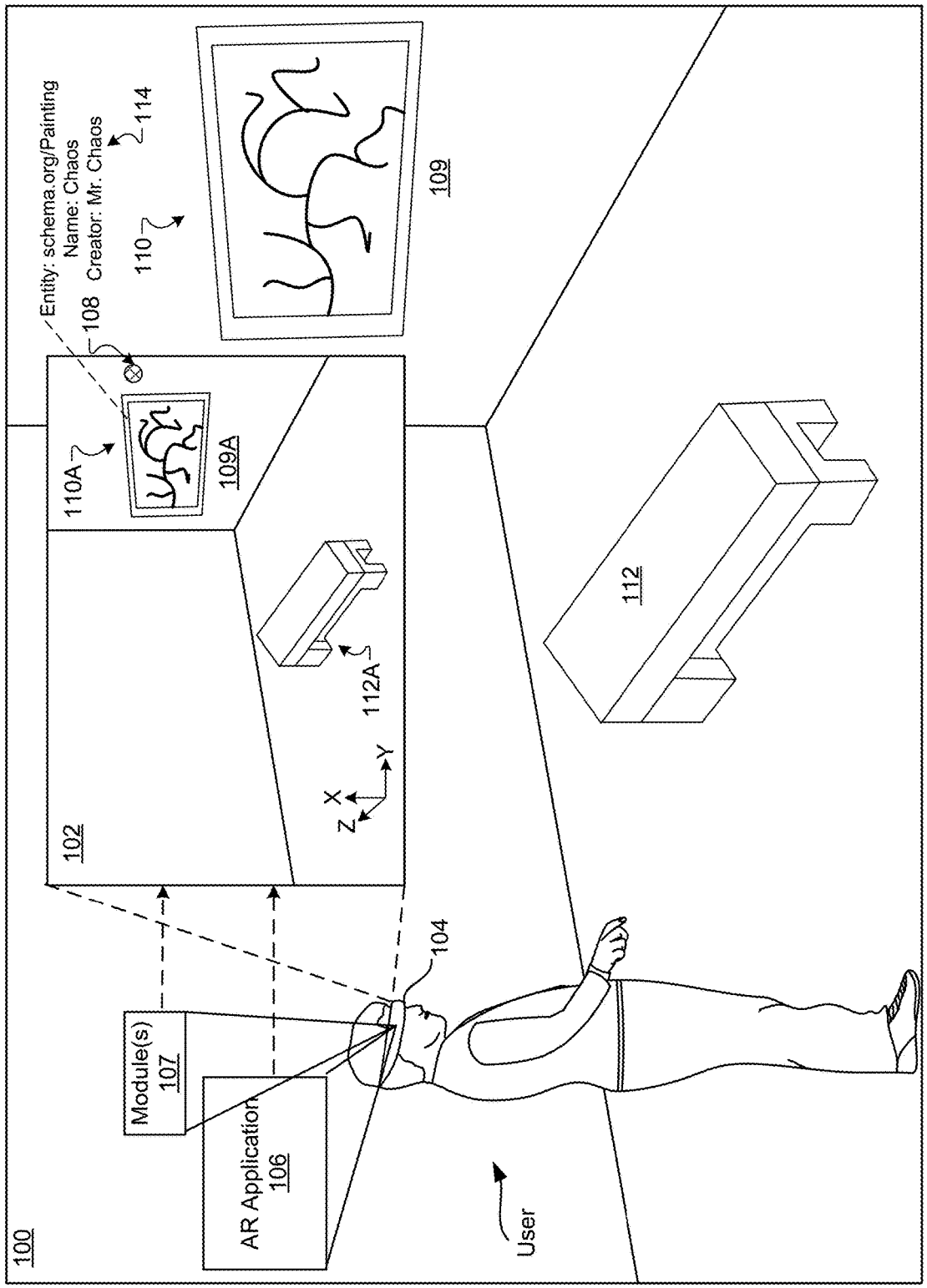
FIG. 1A is a third person view of an example physical space, in which a user is experiencing an augmented reality (AR) environment through a display.

This document describes systems and methods for placement of user interface (UI) content (e.g., UI content items) within an AR environment according to relationships between UI content items and features associated with a physical (e.g., real-world) object. In conventional AR experiences, the layout of UI content and/or AR objects may be determined (and dictated) by the application presenting the UI content (e.g., UI elements, UI content items, AR objects, VR objects, etc.). The systems and methods described herein may use a different paradigm than conventional systems to provide layout and presentation of content in the AR environment. For example, the systems and methods may operate at a framework level architecture rather than the application level architecture provided by conventional systems that provide content via applications.

The framework used by the systems and methods described herein can operate as an interface (e.g., interpreting layer) that functions using a number of operating system primitives. For example, the framework may function as an interpreting layer in between a UI generation architecture and rendering architecture of an AR environment. The framework may maintain and update a semantic graph relating user interface (UI) nodes and relationships between such nodes. The framework can use the UI nodes and relationships between the nodes to determine when and how to present AR content and/or UI content in the AR environment. Each interaction in the AR environment with the presented AR and/or UI content can trigger the framework to modify the semantic graph and subsequently alter a particular UI layout at runtime.

In some implementations, the systems and methods described herein may use relationship data associated with UI content items, contextual information pertaining to the user, data associated with the environment (e.g., platform, devices, identified scene elements, etc.), data associated with the UI content, and the like, to determine and present a layout of UI content and/or AR objects in the AR environment. Such systems may maintain context for the user to provide a cohesive AR experience using relevant semantic relationships associated with depicted UI content. The systems may maintain context across different operating systems, different devices, and different AR environments.

In general, one technical problem that may arise when providing user-relevant AR experiences across different devices and platforms is utilization of an AR environment context (e.g., user context, device context, etc.) for depicting particular UI content. For example, conventional AR environments may fail to assess and implement a user interface layout that accounts for an AR environment context that is relevant to a particular user (or device) accessing the content in an AR (or mixed-reality (MR)) environment. For example, each device type and/or platform for presenting AR or MR content may utilize different user interface presentation components, object identification services, and/ or content generation services. In some platforms, experiences are built as applications (i.e., apps) with dependencies on particular platform runtimes. Thus, conventional AR or MR experiences built for one device type (or platform) may not be accessible on a different device type (or platform).

The systems and methods described herein may provide a technical solution to the above technical problem by providing dynamic AR (and/or MR) experiences across multiple platforms and devices using rules, relationships, and/or a determined AR environment context. For example, the systems and methods described herein can provide an advantage of determining a particularly user-friendly navigable layout for UI content to be depicted in the AR or MR environment. The layout of the UI content may be based on the AR environment context determined according to system-generated descriptions of one or more relationships between particular UI content items and a scene that may provide the particular UI content items. For example, the systems and methods described herein may generate graphs that describe UI content items and relationships between the UI content items. The graphs may be accessed when the system provides UI content items (e.g., provided as AR objects) to users in the AR or MR environment. In some implementations, the graphs may be updated at runtime to include additional relationships and information.

In some implementations, the systems and methods described herein may allow any number of processes to participate in generating and placing UI content for a scene (in an AR environment). Unlike conventional AR systems that rely on applications to provide and place UI content, the systems (e.g., framework) and methods described herein utilize a framework that may use operating system primitives executing on an AR computing device to mediate and generate affordances for suggesting and placing UI content within one or more scenes in the AR environment.

For example, the framework described herein may determine and adapt a layout of particular UI content according to a particular AR scene. For example, the operating system may determine whether to depict UI content in the AR environment based on available space within the scene and may move the UI content while following flexible semantic relationships associated with the UI content. Example semantic relationship may include, but are not limited to indications that particular UI content be adjacent, on top of, coplanar with other UI content. The operating system can resolve the relationships and rules to ensure that UI content (e.g., two-dimensional (2D) and three-dimensional (3D) AR objects) can be conveniently placed and updated for the user while following relationships tracked via the semantic graph, and associated with the UI content and/or AR environment.

In some implementations, the framework described herein may operate with an operating system associated with a device executing the AR environment. In some implementations, the framework may function as a layer that communicates with the operating system associate with a particular device. In some implementations, the framework may operate within the operating system associated with a particular device.

In some implementations, the framework may interface with any number of different runtimes that may provide information to a render and/or composite into the AR environment based on a semantic graph. Context, content, and data associated with each runtime may be tracked in the semantic graph in order to display the content in a scene in a user-relevant manner. For example, any number of applications may execute runtimes that can be tracked via the semantic graph so that a user-relevant UI layout can be displayed in the AR environment. Similarly, relationships associated with multiple runtimes of the same application can be tracked via the semantic graph in a similar manner. In addition, other content providers including the operating system, online content providers, other users of the AR environment, and the like may execute with the framework described herein such that the content can be arranged together in the same scene, according to the semantic graph.

Utilizing the framework described herein instead of an application to mediate and generate affordances for placing UI content may provide the advantage of allowing semantic relationships associated with portions of the UI content to be used as a basis for layout and presentation of the UI content in the AR environment. In such an example, the architecture responsible for layout of the UI content can shift to take into account current user focus and the subject matter of the UI content. For example, the operating system executing on the AR computing device may generate and provide a layout of UI content according to a graph that accounts for semantically expressed relationships to one or more real-world objects or to UI content depicted based on the one or more real-world objects.

In some implementations, the graph may dictate layout according to the relationship information and predefined UI pattern rules. The graph may be updated at runtime when new UI content is requested to be added to the layout. In general, the graph may depict how UI content is to be presented within the AR environment. Each graph may include nodes of UI content connected by the semantic relationships that may be followed to display the UI content in the AR environment, as users continue to interact with the UI content. In some implementations, the graph may be a node graph in which portions of the graph are generated at runtime as a user interacts with UI content presented in the AR environment. The graph may be associated with predefined rules and relationships, system generated rules and relationships, and/or user generated rules and relationships.

FIG. 1A is a third person view of an example physical space 100, in which a user is experiencing an augmented reality (AR) environment 102 through a display of an HMD device 104. The AR environment 102 can be generated by an AR application 106 (using one or more modules 107) and displayed to the user through the HMD 104, or other device. The AR environment 102 includes inserted AR object 108 (e.g., content) that is displayed over an image of the physical space 100. In this example, the AR object 108 is an affordance dot on a representation 109A of a wall 109 near a representation 110A of a painting 110 in the AR environment 102. In addition, a representation 112A of a bench 112 is also depicted in the AR environment 102.

Although many of the examples described herein are described in terms of placement of the AR object, such placement of the AR object providing UI content can include initial placement, tracking, movement, and/or so forth of the AR object. In some implementations, initial placement can be performed using graph relationships and rules. In some implementations, initial or updated placement may be automated or may be user input based including, but not limited to dragging, tap-to-place, and/or so forth.

In some implementations, the AR environment can be a mixed reality environment including a mixture of virtual objects and physical objects (e.g., virtual objects within a physical or real-world). The AR environment can be displayed with in a display of a device such as a head-mounted display (HMD) device, a mobile device, a tablet device, and/or so forth. The AR environment can be an environment in which the user can place and interact (e.g., manipulate, elevate, move, interact with, etc.) with virtual objects in a physical space within the displayed AR environment. In some implementations, such virtual objects can include stickers, characters, sprites, animations, 3D renderings, and so forth.

When the user moves within the physical space 100, the AR environment items 102, and the virtual objects therein, move in a corresponding fashion. In other words, the AR object 108 is moved within the AR environment 102 based on the movement of the user in the physical space 100. The AR object 108 can be moved and placed within the AR environment 102 based on the depth information associated with the AR object 108. For example, if the user moves away from the bench 112 in the physical space 100, the AR object 108 can have an appearance with the AR environment 102 shown in the display (e.g., within the screen of the HMD device 104) that is further away. This rendering can be based on the depth information associated with the AR object 108.

In some implementations, the systems described herein may perform placement of UI content to utilize user context within the AR environment, device characteristics associated with the AR environment, and/or software platform characteristics associated with the AR environment. For example, the systems described herein may account for user context by utilizing semantic relationships determined from a provider of UI content to select and display other UI content. For example, a content developer may launch an intent that may be expected to resolve to a UI-providing module with an explicit semantic relationship (e.g., launch a video player may inherently indicate to co-present the video with a UI element associated with a request to launch the video).

As shown in FIG. 1A, the user may be viewing AR content, such as representation 110A. As the user approaches painting 110 (i.e., a real world object) and representation 110A, the systems described herein may recognize the painting 110 and can apply one or more semantic labels 114 to the representation 110A (which is an AR object). The label 114 may describe the painting 110 and may be created using information retrieved from one or more content sources. For example, the painting 110 and the label 114 may represent UI content retrieved from either or both online and offline data sources. In general, the label 114 may be an invisible element that us not viewable by the user. In some implementations, the label 114 may be visible to the user and provided in any location in the AR environment 102.

Generating a label for the painting 110 and/or AR object representation 110A may include retrieving information about the painting 110. The information may include facts or UI content items associated with the painting 110. In the depicted, example, the information includes what the entity is (e.g., schema.org/Painting), the name associated with the painting 110 (e.g. Chaos), and the creator (e.g., Mr. Chaos). Other information may also be retrieved.

The information may be used to generate a mapping of the information to the painting 110. In some implementations, the mapping may be used to associate the painting 110 to a region of the AR environment 102. For example, in this example, a mapping may now exist between a semantic entity representing the painting 110 and a region in the scene depicted in the AR environment 102.

Based on the mapping and/or nearness of the user to the painting 110, an affordance 108 (represented as an AR object) may be presented within a threshold distance of the painting 110. As used herein, an affordance may represent an AR object presented to offer one or more UI elements, UI content, services, and/or operational elements to a user accessing the AR environment depicting affordance. Any shape or object may represent an affordance including both visible and invisible elements.

The mapping and information that generates the affordance may also generate or update at least one graph (or a portion of a previously generated graph). The graph may use the mapping and information pertaining to any number of UI content items related to the painting 110 to provide a way in which to lay out any of the retrieved UI content. For example, a root node (entity) associated with a graph may represent a system-recognizable AR object. The system may place an affordance to indicate to a user that additional information is available for presentation.

In general, an affordance (e.g., affordance 108) may be selectable to provide any number of UI content items related to the painting 110 (or other object represented in the AR environment). Information available using the affordance 108 may be based on one or more graphs. Once the affordance 108 is presented in the AR environment 102, the user may select the affordance to be provided particular UI content items. In operation, the UI content items may be generated at a second AR object which may replace the affordance 108 provided as the first AR object. The UI content items may be generated and depicted according to the graph. For example, rules, relationships, and content indicated in the graph may be used to determine and provide a user-relevant layout of the content.

Figure 1B:
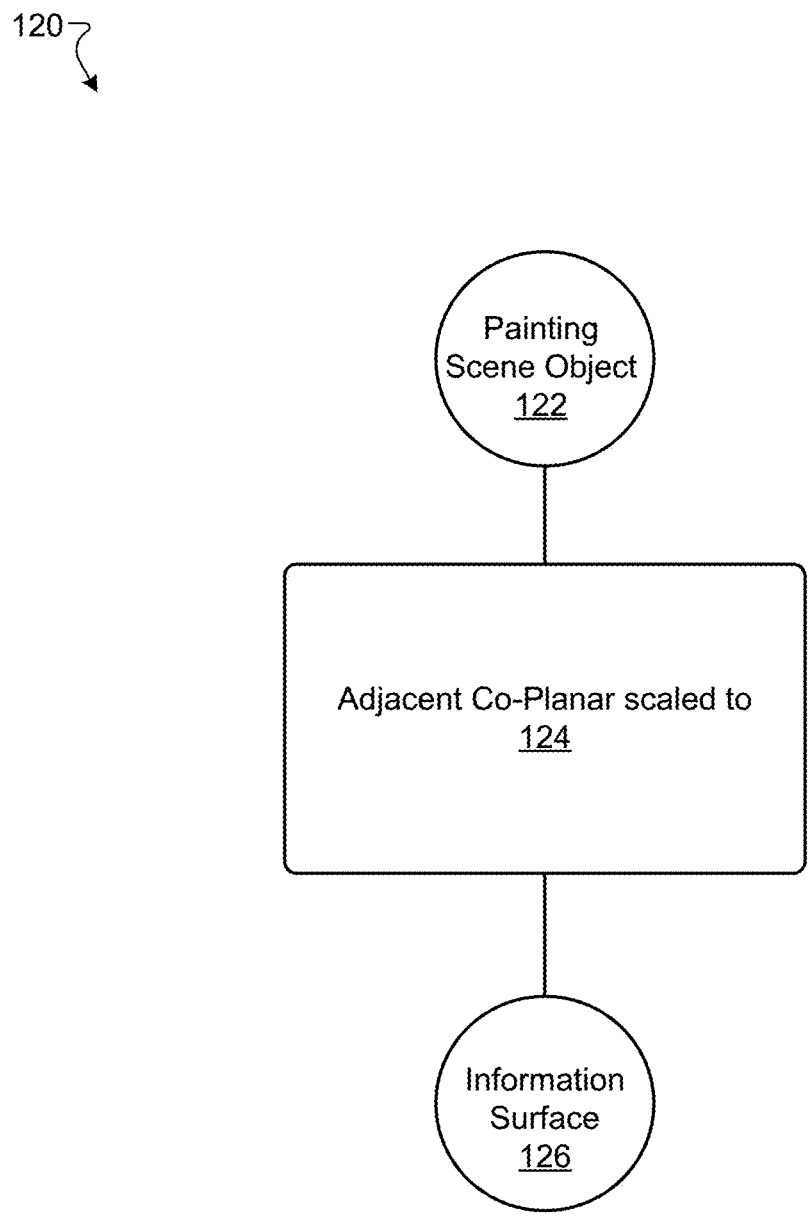
FIG. 1B is a graph for generating at least one virtual user interface according to semantic relationships associated with user interface (UI) content shown in FIG. 1A.

FIG. 1B is a graph 120 for generating at least one virtual user interface according to semantic relationships associated with user interface (UI) content shown in FIG. 1A. The graph 120 includes a node 122, a relationship edge 124, and a node 126. The node 122 represents the AR object shown by representation 110A indicated in the graph as a painting scene object. The relationship edge 124 represents that the content represented by node 122 is to be placed adjacent to, co-planar with, and scaled to content represented by node 126. In some implementations, the relationship edge 124 represents three edges collapsed in the illustrated FIG. 1B for clarity. For example, each relationship may represent an edge.

The node 126 represents an information surface, such as an additional surface (e.g., AR object) that is presented near the representation 110A in the AR environment. That is, graph 120 indicates that the representation 110A (node 122) is to be placed adjacent to, co-planar with, and scaled to any information surface (node 126 representing an AR object providing UI content) that is provided with representation 110A. The semantic relationships depicted in the graph 120 may be carried out for display in the AR environment, for example, when the user selects the affordance (AR object 108) to display more UI content.

In general, the systems and methods described herein may employ use of a graphs to present UI content having multi-dimensional semantic relationships that link one or many scene objects and one or many UI elements (and or AR objects or AR regions) to each other. The graphs may be used to interpret the combination of relationships. In some implementations, the graphs may encode a particular user focus/context. In some implementations, the graphs may be used to assess device capabilities.

Each graph may be used to create a relevant mixed reality presentation. In addition, the systems and methods described herein can determine a layout for the UI content based on such generated graphs to enable operating systems/framework providing the AR environment to take into account a current context associated with devices in use for the AR or MR environment. In some implementations, the systems and methods described herein may also update graphs to provide improved presentation (e.g., layout) using the same graph information without having to modify UI content being depicted in the AR environment.

In some implementations, a graph may define a number of semantic relationships between the information and one or more of the UI content items. For example, a graph may define a collection of surfaces in a UI interface and relationships between the particular surfaces. Each node in the graph may represent a surface and each edge represent semantic relationship between a parent node and a child node and so on. The surface may include UI content, which may begin to provide the user with a navigable interface generated as AR objects, for example.

Figure 2A:
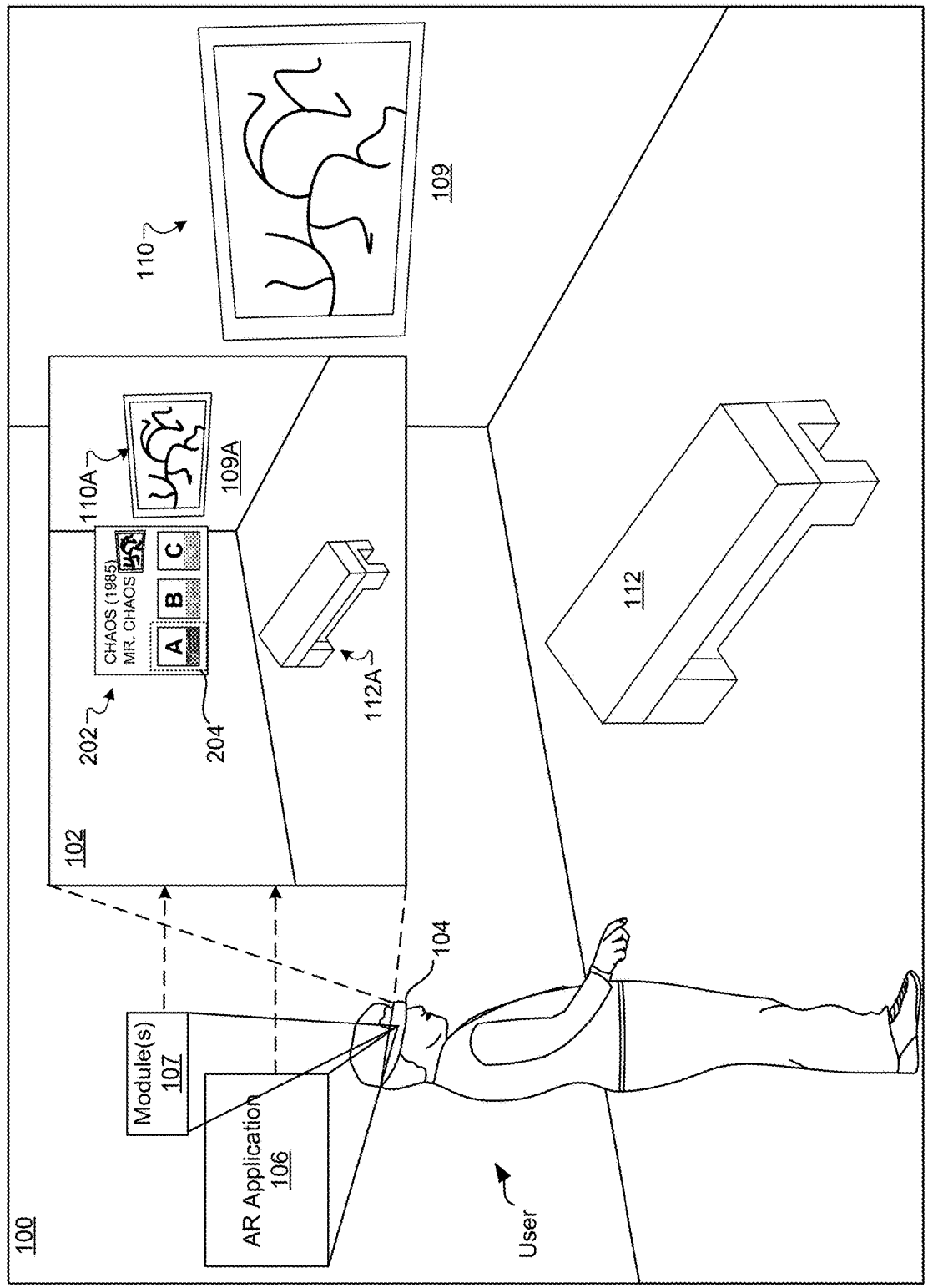
FIG. 2A illustrates UI content populated within the AR environment based on semantic relationships.

FIG. 2A illustrates UI content 202 being populated within the AR environment based on a plurality of semantic relationships. Similar to FIG. 1A, the AR environment 102 shown in FIG. 2A can be generated by the AR application 106 (using one or more modules 107) and displayed to the user through the HMD 104, or other device. The AR environment 102 includes at least one AR object 202 (e.g., content A, B, and C) displayed over an image of the physical space 100. In this example, the AR object 202 is a UI element including a number of separate UI content items. The AR object 202 is placed near the representation 110A of the painting 110 in the AR environment 102.

The AR object representing UI content 202 may be provided based on user selection of affordance 108. In some implementations, the affordances described herein are configured to begin a navigable AR experience (e.g., story) that provides interactive UI content for the user. The experience may represent an interface (e.g., interface shell) in which a number of content items (e.g., A, B, C) may be presented within an AR environment. Each interface may include various ways of providing modules that represent portions of instructions that may generate user interface content for the AR environment. The modules may indicate how the user interface content may be arranged together into a cohesive experience for a user. The modules may be executed by the operating system providing the AR environment, for example. Additional information pertaining to modules, interfaces, and UI layout are described below in at least FIGS. 6, 7, and 8.

In some implementations, the provider of one or more affordances may not have a user interface, such as those identifying and labeling scene objects. Scene object labelling may be progressive, and thus identifying a painting, as described throughout examples above may trigger the loading of a specialized module capable of labeling the painting more explicitly. By decoupling the labels from the presentation, we free ourselves from caring how many processes are contributing to the labeling, or whether the original process is still running or has been suspended because the entire environment is labelled already.

Referring again to FIG. 2A, upon selection of affordance 108, the UI content 202 is displayed to the user and an AR experience is begun for the user. The AR experience provides an interface that depicts UI content 202 according to graph 120. That is, a visible information module that has a semantically expressed relationship to non-visible scene object (i.e., an AR object providing UI content 202). In this example, the semantically expressed relationship includes adjacent, co-planar, and scaled to, as described with respect to FIG. 1B, to place the AR object (having a UI surface) beside, co-planar with and scaled to the semantic object (i.e., the representation 110A of painting 110). In some implementations, an agent (e.g., daemon, module, interface, operating system, application) which determines to provide information via the visible information module may provide (e.g., express) the semantic relationship information to the graph.

Each UI content item A, B, and C may be provided by a module, as described above. Each UI content item may provide one or more affordances to provide additional information, enlarged versions of the UI content item, additional UI content items [2D and/or 3D], executable data, images, video, text, and the like. In this example, the user is provided UI content 202 which includes a video A (provided on a surface of an AR object), a carousel gallery B, and a 3D comic C. In this example, the user selects 204 of content item A to present the video A. The content item A may be associated with a graph with rules and/or relationships. Here, the graph for UI content 202 may express that that the video of content item A should be co-presented with UI content 202 and thus both content 202 and content item A are depicted together. The UI content 202 may function as a parent to content item A. Content item A may be unaware of any content or interaction occurring with elements of UI content 202. In general, the systems described herein can use a context associated with the user of the AR environment 102 and may utilize the expressions of any parent UI elements and apply such expressions to the child elements (i.e., AR object surfaces). In some implementations, the systems described herein may not utilize expressions of parent UI elements, but may instead include rules to handle 2D content in a particular path of a graph as being part of a virtual screen located adjacent and co-planar to the representation 110A of painting 110. For example, a parent UI element may include functionality to infer that content triggered from the parent UI element is to be co-presented with the parent UI element based on a context. That is, if the systems described herein are aware of two UI elements publishing and consuming content associated with a particular node of the graph, then the system may infer that content provided by the two UI elements should be co-presented.

Figure 2B:
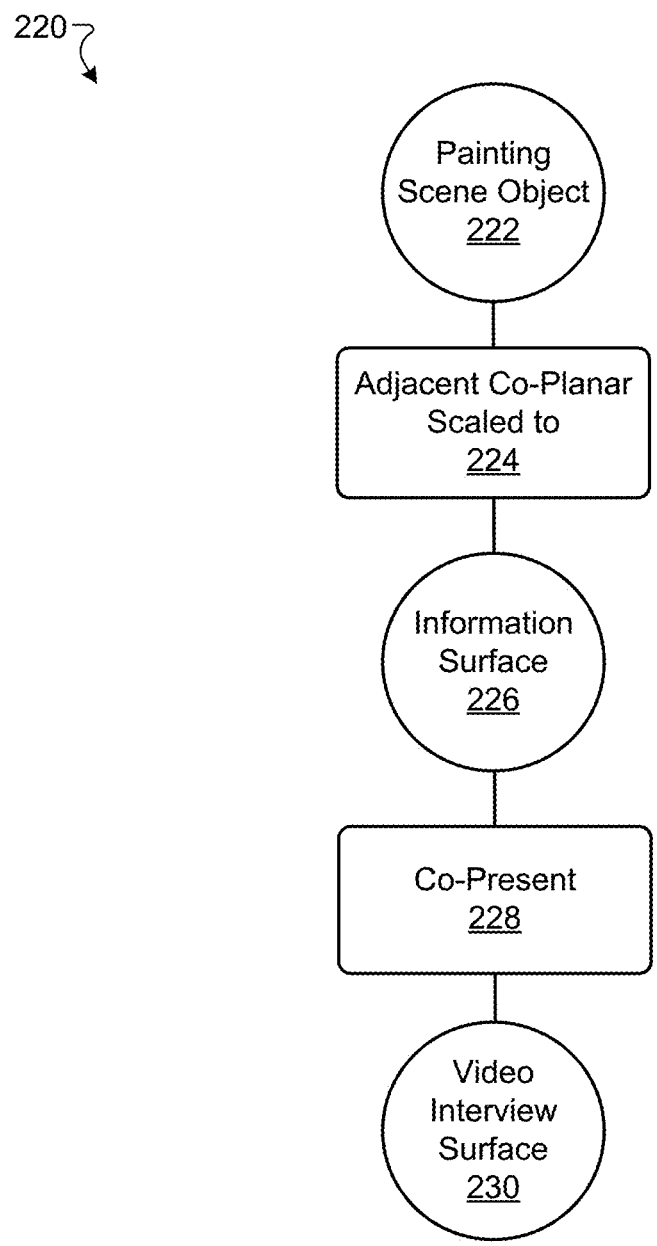
FIG. 2B is a graph for generating at least one virtual user interface according to semantic relationships associated with UI content shown in FIG. 2A.
Figure 3A:
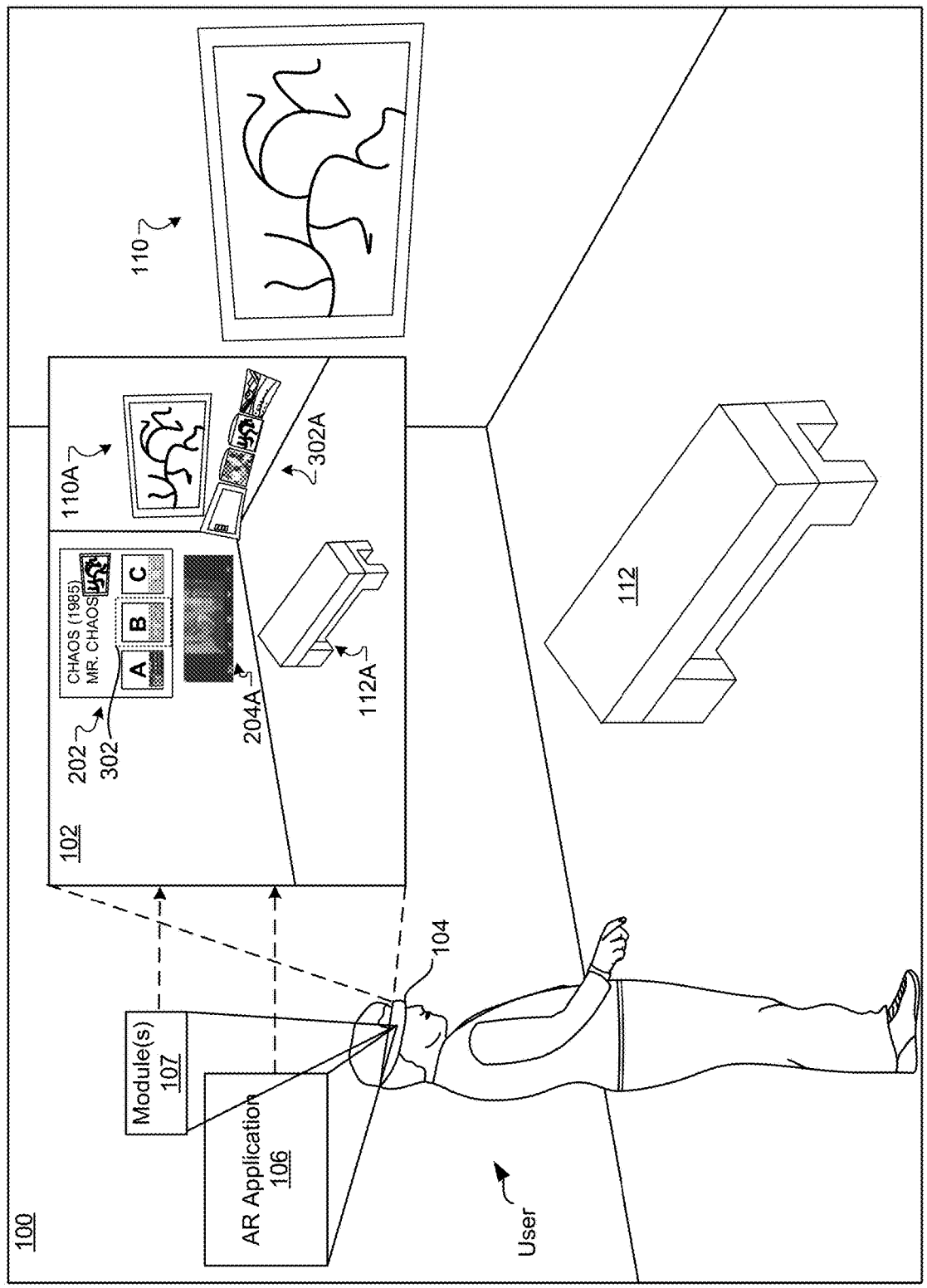
FIG. 3A illustrates additional UI content populated within the AR environment based on semantic relationships.

FIG. 2B is a graph 220 for generating at least one virtual user interface according to semantic relationships associated with UI content shown in FIG. 2A. The graph 220 includes a node 222, a relationship edge 224, a node 226, a relationship edge 228, and a node 230. The node 222 represents the AR object shown by representation 110A indicated in the graph 220 as a painting scene object. The relationship edge 224 represents that the content represented by node 222 is to be placed adjacent to, co-planar with, and scaled to content represented by node 226. The node 226 represents an information surface (for an AR object), such as UI content 202 that is presented near the representation 110A in the AR environment 102. That is, graph 220 indicates that the representation 110A (node 222) is to be placed adjacent to, co-planar with, and scaled to any information surface (node 226) that is provided with representation 110A. The relationship edge 228 indicates that any content item depicted with content represented by node 226 should be co-present with the content represented by node 226. Here, the graph 220 indicates a node 230 represents a way to access video content item A 204 from a video interview surface that should be co-present with content represented by node 226. Thus, the video content item A 204 may be provided in the AR environment 102 co-present to UI content 202, as shown in FIG. 3A by video depicting content item A 204A. The semantic relationships depicted in the graph 220 may be carried out for display in the AR environment, for example, when the user selects the affordance (AR object including content item A 204) to display a scaled and co-present content item A 204A. In this example, the content item A 204 may function as a selectable affordance to depict content item shown at 204A, which is scaled and interactive version of content item A 204A.

FIG. 3A illustrates additional UI content 302A populated within the AR environment 102 based on semantic relationships. Similar to FIG. 2A, the AR environment 102 shown in FIG. 3A can be generated by the AR application 106 and displayed to the user through the HMD 104, or other device. The AR environment 102 includes AR objects representing UI content 202 (e.g., content A, B, and C), and video content 204A displayed over an image of the physical space 100. The user selects an affordance associated with content item B 302 to trigger depiction of carousel 302A.

Upon selection of an affordance associated with content item B 302, the UI content 302A is displayed to the user for access to the content 302. In this example, the carousel of images represented by content item 302A is designed for AR viewing. In addition, the carousel is provided in 3D. The content item 302A may provide a carousel of images that have explicit position, scale, and rotation presentation relationships. The presentation relationships may be defined in one or more graphs and may be relative to a semantic AR object (e.g., content item 302), relative to a particular surface (e.g., UI content 202), or relative to a user, just to name a few examples.

Figure 3B:
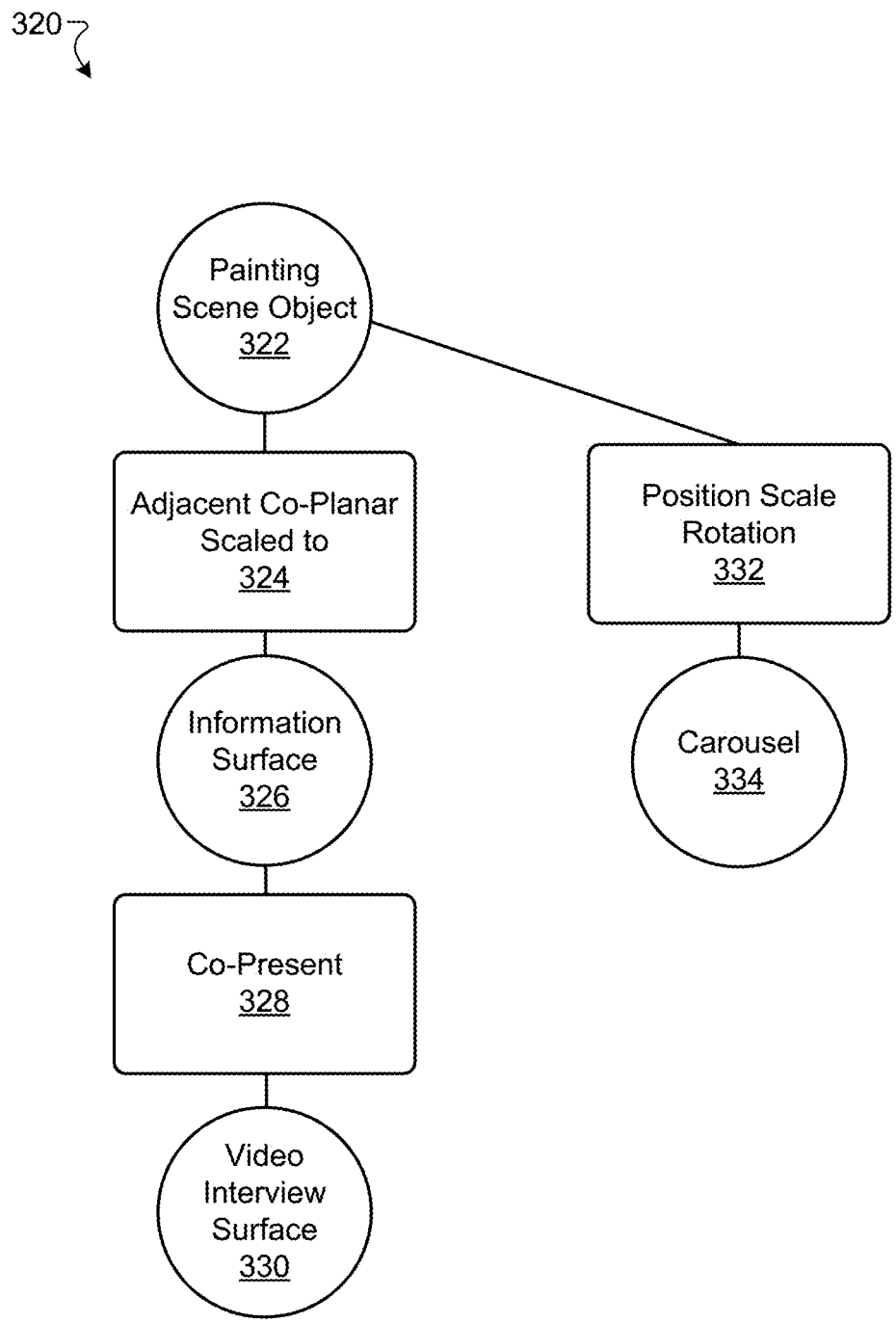
FIG. 3B is a graph for generating at least one virtual user interface according to semantic relationships associated with UI content shown in FIG. 3A.

FIG. 3B is a graph 320 for generating at least one virtual user interface according to semantic relationships associated with UI content shown in FIG. 3A. The graph 320 includes a node 322, a relationship edge 324, a node 326, a relationship edge 328, a node 330, a relationship edge 332, and a node 334. The node 322 represents the AR object shown by representation 110A indicated in the graph 320 as a painting scene object. The relationship edge 324 represents that the content represented by node 322 is to be placed adjacent to, co-planar with, and scaled to content represented by node 326. The node 326 represents an information surface (for an AR object), such as UI content 202 that is presented near the representation 110A in the AR environment 102. That is, graph 320 indicates that the representation 110A (node 322) is to be placed adjacent to, co-planar with, and scaled to any information surface (node 326) that is provided with representation 110A. The relationship edge 328 indicates that any content item depicted with content represented by node 326 should be co-present with the content represented by node 326. Here, the graph 320 indicates a node 330 represents video content item A 204 as a video interview surface that should be co-present with content represented by node 326. Thus, the video content item A 204 may be provided in the AR environment 102 co-present to UI content 202, as shown in FIGS. 3A and 4A by video depicting content item A 204A.

The relationship edge 332 represents that content represented by node 334 (e.g., the carousel 302A) is to be positioned, scaled, and rotated with respect to content represented by node 322 (i.e., the representation 110A of painting 110). The semantic relationships depicted in the graph 320 may be carried out for display in the AR environment, for example, when the user selects the affordance (AR object including content item B 302) to display a positioned, scaled, and rotated content item B 302. In this example, the content item B 302 may function as a selectable affordance to depict the carousel content item shown at 302A, which is scaled and interactive version of content item B 302.

Figure 4A:
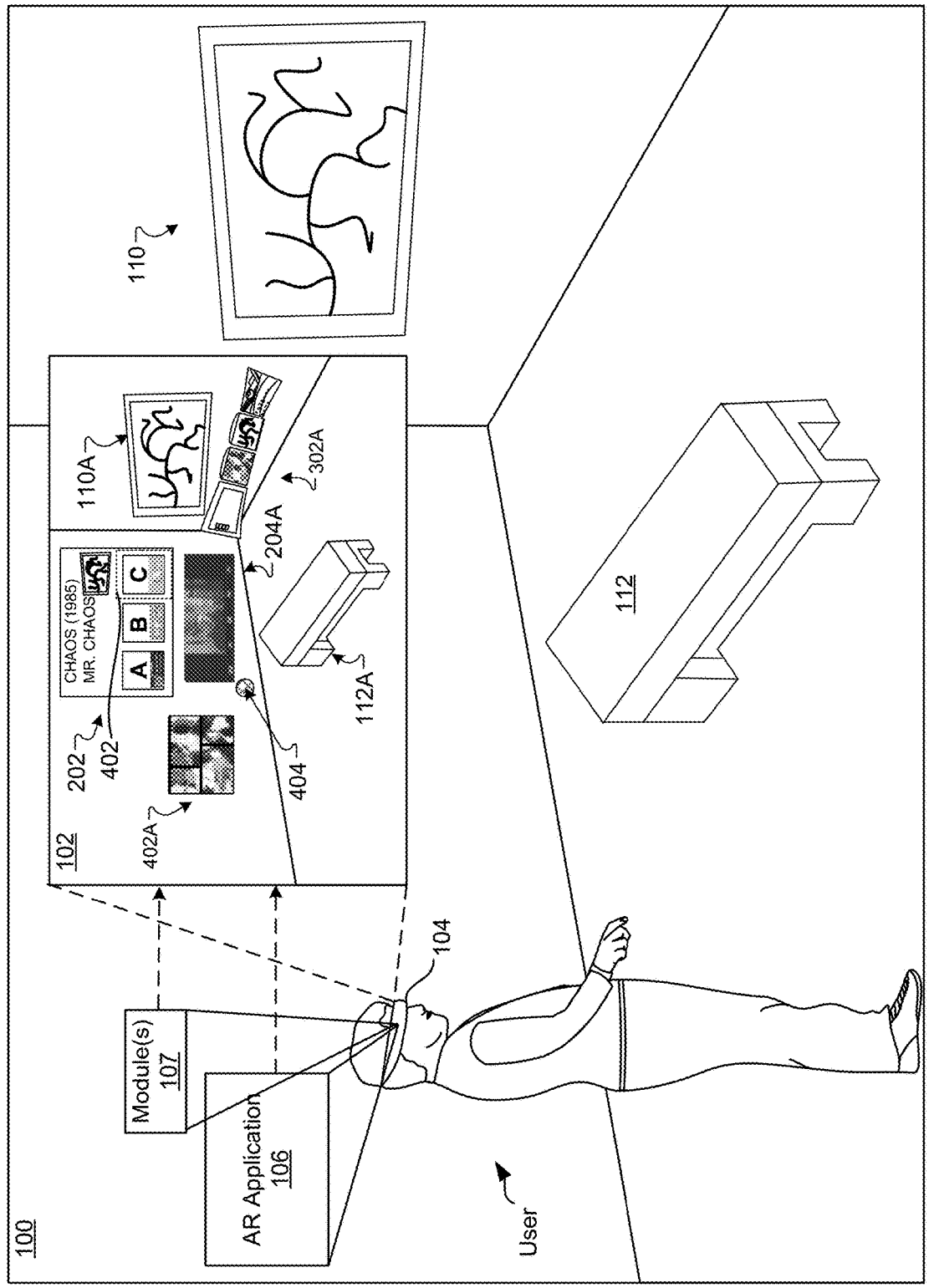
FIG. 4A illustrates additional UI content populated within the AR environment based on semantic relationships.

FIG. 4A illustrates additional UI content 402 populated within the AR environment 102 based on semantic relationships. Similar to FIG. 3A, the AR environment 102 shown in FIG. 4A can be generated by the AR application 106 (using one or more modules 107) and displayed to the user through the HMD 104, or other device. The AR environment 102 includes AR objects representing UI content 202 (e.g., content A, B, and C), video content 204A, carousel 302A, and 3D comic content 402A displayed over an image of the physical space 100. The user selects an affordance associated with content item C 402 to trigger depiction of 3D comic content 402A.

Upon selection of an affordance associated with content item C 402, the UI content 402A is displayed to the user for access to interact with the content 402. In this example, the 3D comic represented by content item 402A is designed for AR viewing. The content item 402A may provide 3D comic images that have explicit position, scale, and rotation presentation relationships. The presentation relationships may be defined in one or more graphs and may be relevant to a semantic AR object (e.g., content item 402), relative to a particular surface (e.g., UI content 202), or relative to a user, just to name a few examples.

Figure 4B:
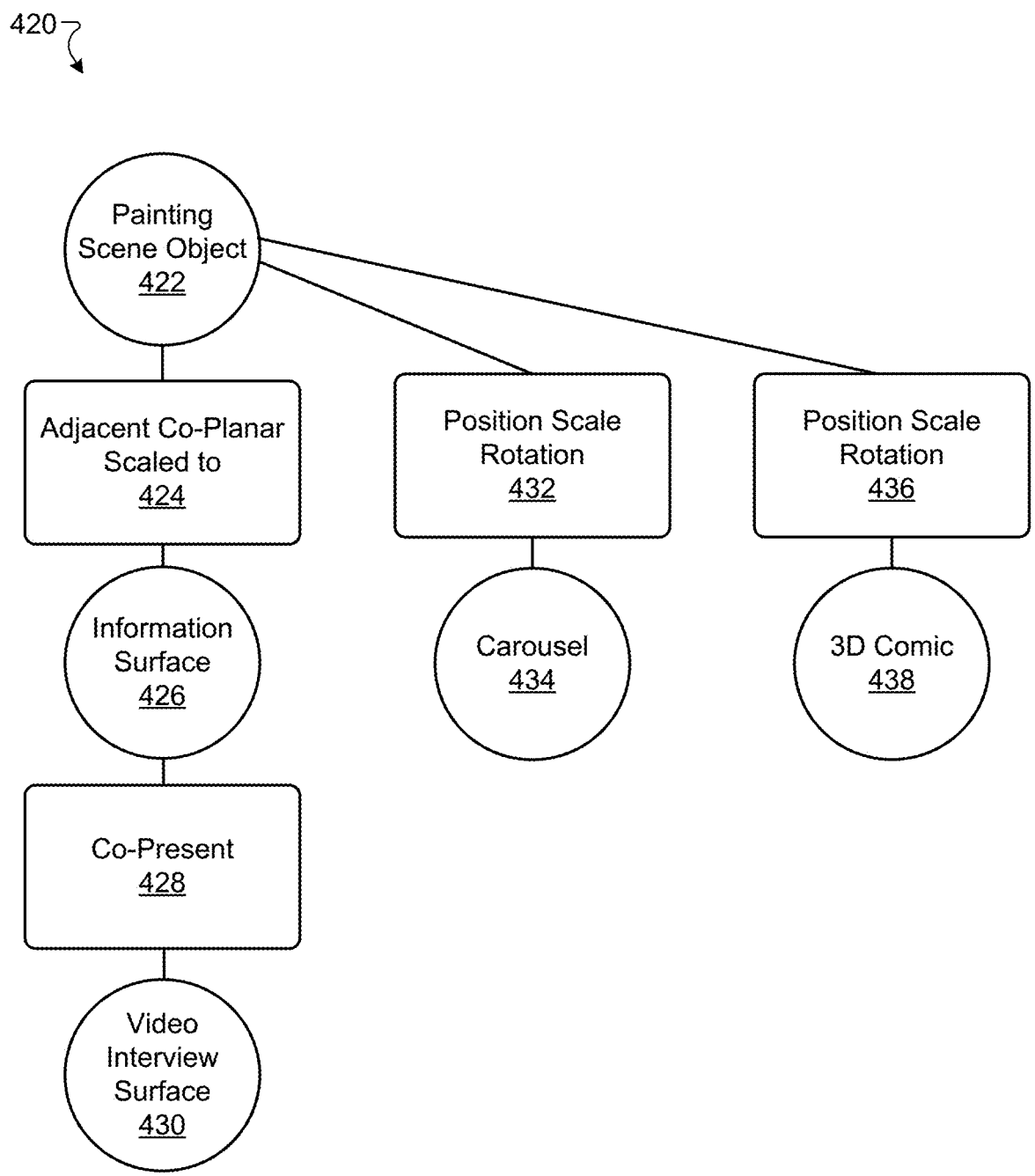
FIG. 4B is a graph for generating at least one virtual user interface according to semantic relationships associated with UI content shown in FIG. 4A.

FIG. 4B is a graph 420 for generating at least one virtual user interface according to semantic relationships associated with UI content shown in FIG. 4A. The graph 420 includes a node 422, a relationship edge 424, a node 426, a relationship edge 428, a node 430, a relationship edge 432, and a node 434. The node 422 represents the AR object shown by representation 110A indicated in the graph 420 as a painting scene object. The relationship edge 424 represents that the content represented by node 422 is to be placed adjacent to, co-planar with, and scaled to content represented by node 426. The node 426 represents the information surface (for an AR object), such as UI content 202 that is presented near the representation 110A in the AR environment 102. That is, graph 420 indicates that the representation 110A (node 422) is to be placed adjacent to, co-planar with, and scaled to any information surface (node 426) that is provided with representation 110A. The relationship edge 428 indicates that any content item depicted with content represented by node 426 should be co-present with the content represented by node 426. Here, the graph 420 indicates a node 430 represents video content item A 204 as a video interview surface that should be co-present with content represented by node 426. Thus, the video content item A 204 may be provided in the AR environment 102 co-present to UI content 202, as shown in FIGS. 3A and 4A by video depicting content item A 204A.

The relationship edge 432 represents that content represented by node 434 (e.g., the carousel 302A) is to be positioned, scaled, and rotated with respect to content represented by node 422 (i.e., the representation 110A of painting 110). The relationship edge 436 represents the information surface (for an AR object), such as UI content 202 that is presented near the representation 110A in the AR environment 102. That is, graph 420 indicates that the representation 110A (node 422) is to be placed adjacent to, co-planar with, and scaled to any 3D comic content (node 438) that is provided with representation 110A.

The semantic relationships depicted in the graph 420 may be carried out for display in the AR environment, for example, when the user selects the affordance (AR object including content item C 402) to display a positioned, scaled, and rotated content item C 402. In this example, the content item C 402 may function as a selectable affordance to depict the 3D comic content item shown at 402A, which is scaled and interactive version of content item C 402.

As shown in FIG. 4A, an additional affordance 404 is provided in the AR environment 102. The affordance 404 indicates that additional information or interaction associated with video content item 204A may be available. The user may select affordance 404 to be presented with such information or interaction.

In response to receiving the selection of the affordance 404, which may be provided as an AR object, the system may trigger for display another AR object to provide the interactive information or content.

Figure 5A:
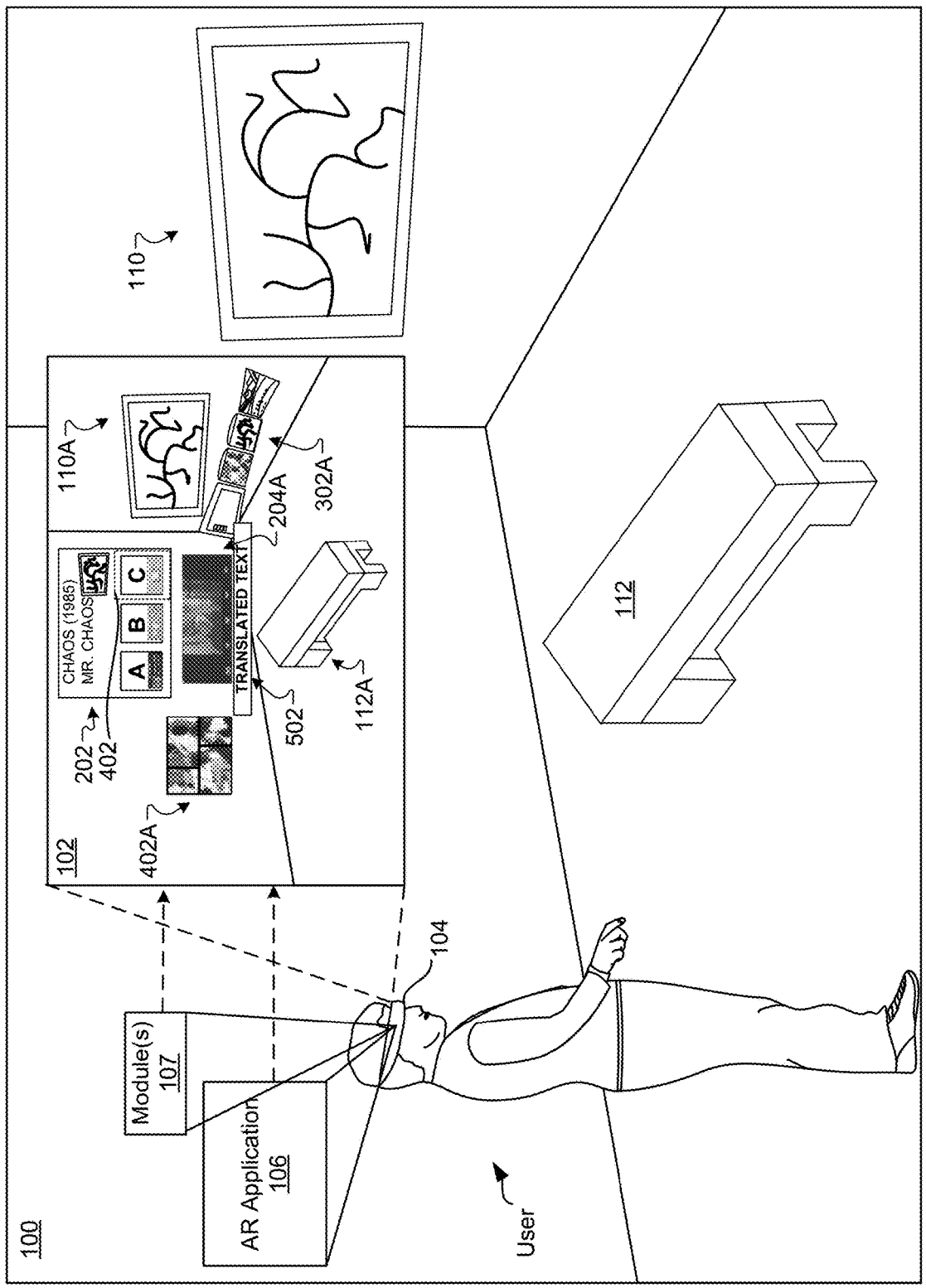
FIG. 5A illustrates additional UI content populated within the AR environment based on semantic relationships.

FIG. 5A illustrates additional UI content 502 populated within the AR environment 102 based on semantic relationships. Similar to FIG. 4A, the AR environment 102 shown in FIG. 5A can be generated by the AR application 106 (using one or more modules 107) and displayed to the user through the HMD 104, or other device. The AR environment 102 includes the AR object representing UI content 202 (e.g., content A, B, and C), video content 204A, carousel 302A, and 3D comic content 402A displayed over an image of the physical space 100.

In this example, the video content 204A shown in FIG. 4A includes an affordance 404 indicating that additional content related to the video content 204A is available. In response, the user selected the affordance 404 to trigger depiction of the additional content. In the example of FIG. 5A, the additional content includes translation content 502 which provides translated text for audio data being provided by the video content 204A.

In some implementations, the video content 204A may be provided by a video module (not shown) while the translation content 502 may be provided by a translation module (not shown). Such modules may be the underlying structure that generates the UI interface that is eventually arranged into the layout of UI elements (202, 402A, 302A, 110A, and 502) shown in FIG. 5A (or another layout). In general, such modules may be generated for one or more surfaces of an AR object.

In the example of FIG. 5A, the translation module may have a specific presentation pattern indicated as a caption pattern, which may be interpreted by the systems described herein as if the captioning were on a virtual screen. Thus, the systems described herein ensure that there is room for the captions by shrinking the video content 204A and placing the captions underneath the video content 204A. In some implementations, captions may function in a different manner. For example, captions may trigger UI content to be placed in a different location, such as behind the caption such that the UI content is depicted in a background of the captions. In some implementations, the UI content may be 3D and the captions provided for the 3D UI content may be provided floating near the caption depicted on a nearby wall.

The presentation relationships for depicting the translation content 502 shown in AR environment 102 may be defined in one or more graphs and may be relevant to a semantic AR object (e.g., content item 204A), relative to a particular surface (e.g., UI content 202), or relative to a user, just to name a few examples. Example graphs are depicted in FIGS. 5B-5D.

Figure 5B:
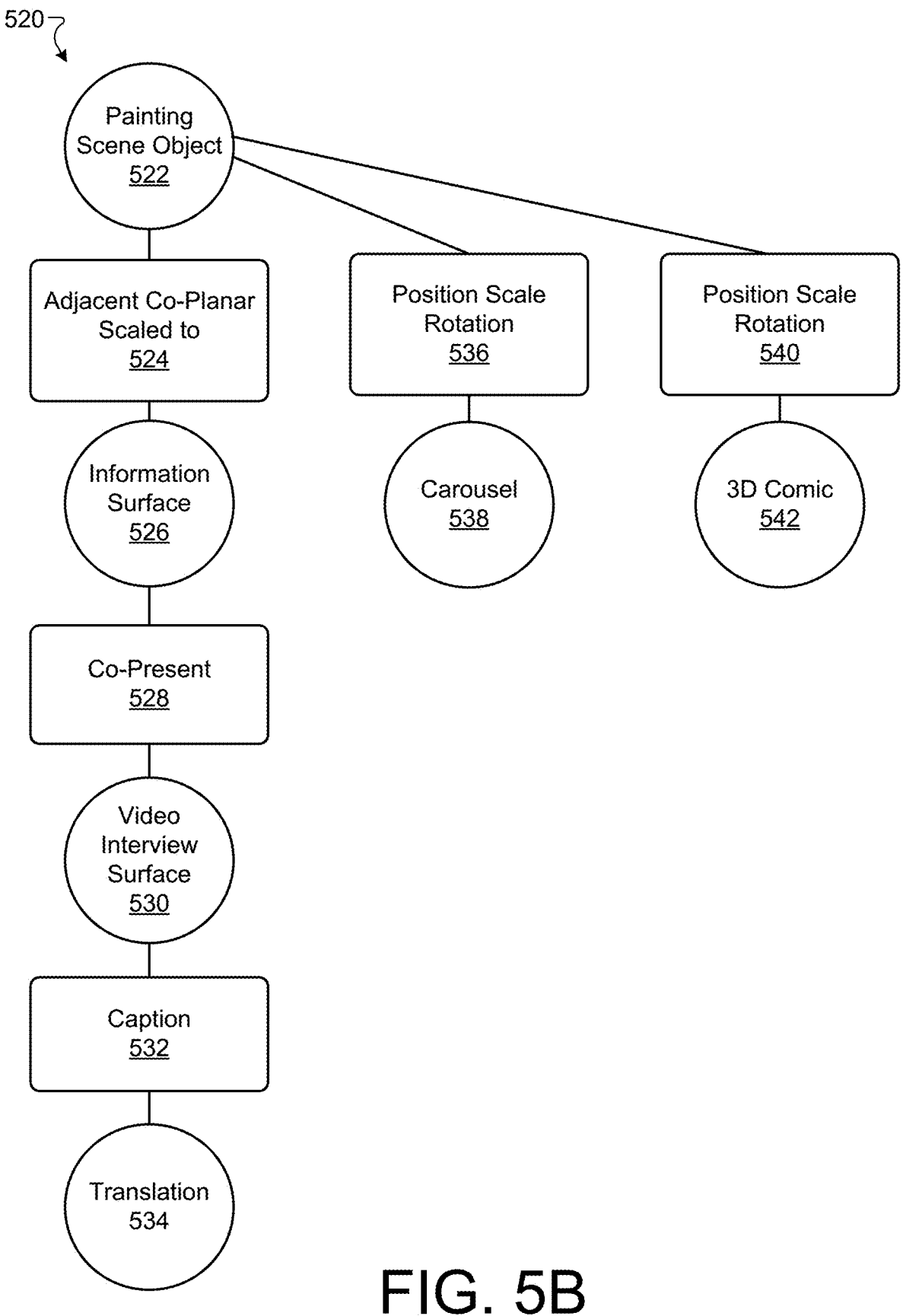
FIG. 5B is a graph for generating at least one virtual user interface according to semantic relationships associated with UI content shown in FIG. 5A.
Figure 5C:
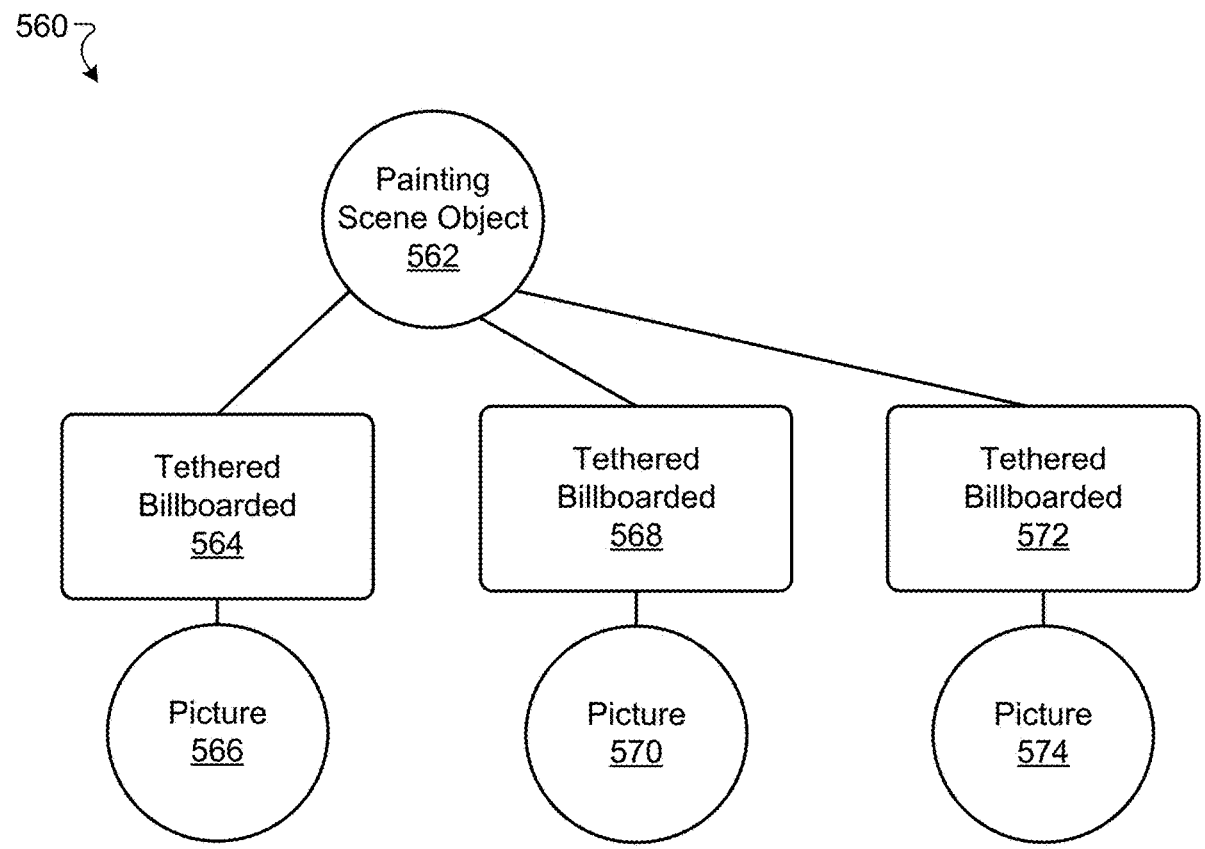
FIG. 5C is another graph for generating at least one virtual user interface according to semantic relationships as a user changes locations in the AR environment.
Figure 5D:
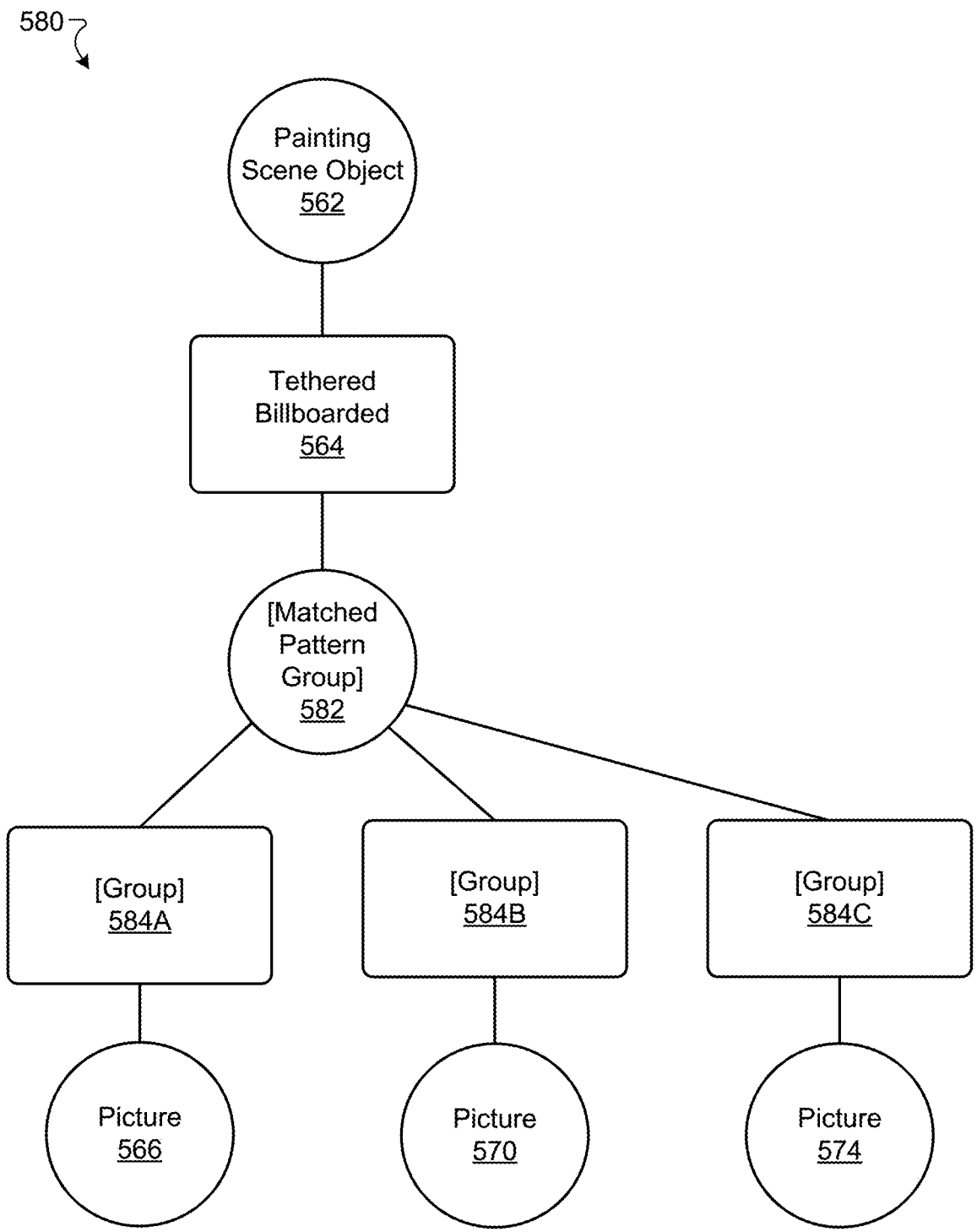
FIG. 5D is yet another graph for generating at least one virtual user interface according to semantic relationships associated with UI content shown in FIG. 5C.

FIG. 5B is a graph 520 for generating at least one virtual user interface according to semantic relationships associated with UI content shown in FIG. 5A. The graph 520 includes a node 522, a relationship edge 524, a node 526, a relationship edge 528, a node 530, a relationship edge 532, a node 534, a relationship edge 536, a node 538, a relationship edge 540, and a node 542. The node 522 represents the AR object shown by representation 110A indicated in the graph 520 as a painting scene object. The relationship edge 524 represents that the content represented by node 522 is to be placed adjacent to, co-planar with, and scaled to content represented by node 526. The node 526 represents the information surface (for an AR object), such as UI content 202 that is presented near the representation 110A in the AR environment 102. That is, graph 520 indicates that the representation 110A (node 522) is to be placed adjacent to, co-planar with, and scaled to any information surface (node 526) that is provided with representation 110A. The relationship edge 528 indicates that any content item depicted with content represented by node 526 should be co-present with the content represented by node 526. Here, the graph 520 indicates a node 530 represents video content item A 204 as a video interview surface that should be co-present with content represented by node 526. Thus, the video content item A 204 may be provided in the AR environment 102 co-present to UI content 202, as shown in FIGS. 3A, 4A, and 5A by video depicting content item A 204A. A relationship edge 532 represents the caption which functions as a parent to display the translation, indicated at node 534.

The relationship edge 536 represents that content represented by node 538 (e.g., the carousel 302A) is to be positioned, scaled, and rotated with respect to content represented by node 522 (i.e., the representation 110A of painting 110). The graph 520 indicates a relationship edge 540 indicates that the representation 110A (node 522) is to be placed adjacent to, co-planar with, and scaled to any 3D comic content (node 542) that is provided with representation 110A.

The semantic relationships depicted in the graph 520 may be carried out for display in the AR environment, for example, when the user selects the affordance (AR object 404) to display a positioned, translation content 502.

FIG. 5C is another graph 560 for generating at least one virtual user interface according to semantic relationships as a user changes locations in the AR environment. In this example, the user may have moved to a new painting or object presented in the physical space 100. As the user moves to the new painting or object, the systems described herein updates the root of the graph 560 to a new painting scene object, shown by node 562. In operation, the systems described herein update the painting scene object to a new instance of the same kind of entity as painting 110. Other objects and/or entity types are possible. In this example, the system may retrieve data associated with the new entity (e.g., an artist name, painting title, etc.) and may provide such data to any UI instances that may be displayed based on the new painting depicted in the AR environment (i.e., based on a detected real world object). In operation, the system may cause all content of existing UI layouts to be updated with the new painting information while retaining all arrangement and presence information to allow for a reusable painting browsing experience. For example, the experience generated by drilling down through the affordances of the examples of FIGS. 1A-5B may be reused to utilize the previous semantic relationships (e.g., adjacent, co-planar, scaled to) which may be re-interpreted to place the same layout in a different location for a new painting or element. For example, UI content associated with a new painting may be provided on a left hand side (or other location) with respect to the painting. The movement may be performed to avoid obscuring content.

As shown, a painting scene object is represented by a node 562. The node 562 is configured to be tethered to one or more UI content items. In this example, a relationship edge 564 indicates that the painting of node 562 should be provided tethered to UI content represented by picture node 566 and provided in a billboard manner. Similarly, a relationship edge 568 indicates that the painting of node 562 should be provided tethered to UI content represented by picture node 570 and provided in a billboard manner. In addition, a relationship edge 572 indicates that the painting of node 562 should be provided tethered to UI content represented by picture node 574 and provided in a billboard manner.

FIG. 5D is yet another graph for generating at least one virtual user interface according to semantic relationships associated with UI content shown in FIG. 5C. In this example, the node 562 and relationship edge 564 are depicted to represent the painting scene object and the tethered, billboard indicators as described above. The systems described herein may utilize the graph 560 of FIG. 5C and upon determining a presentation pattern, may re-structure the graph 580 so that the pictures are members of a particular group 584A, 584B, and/or 584C. Such groups may function as containers to provide any number of pictures (e.g., shown by nodes 566, 570, and 574) and/or other UI content in the AR environment, according to the graph 580.

Figure 6:
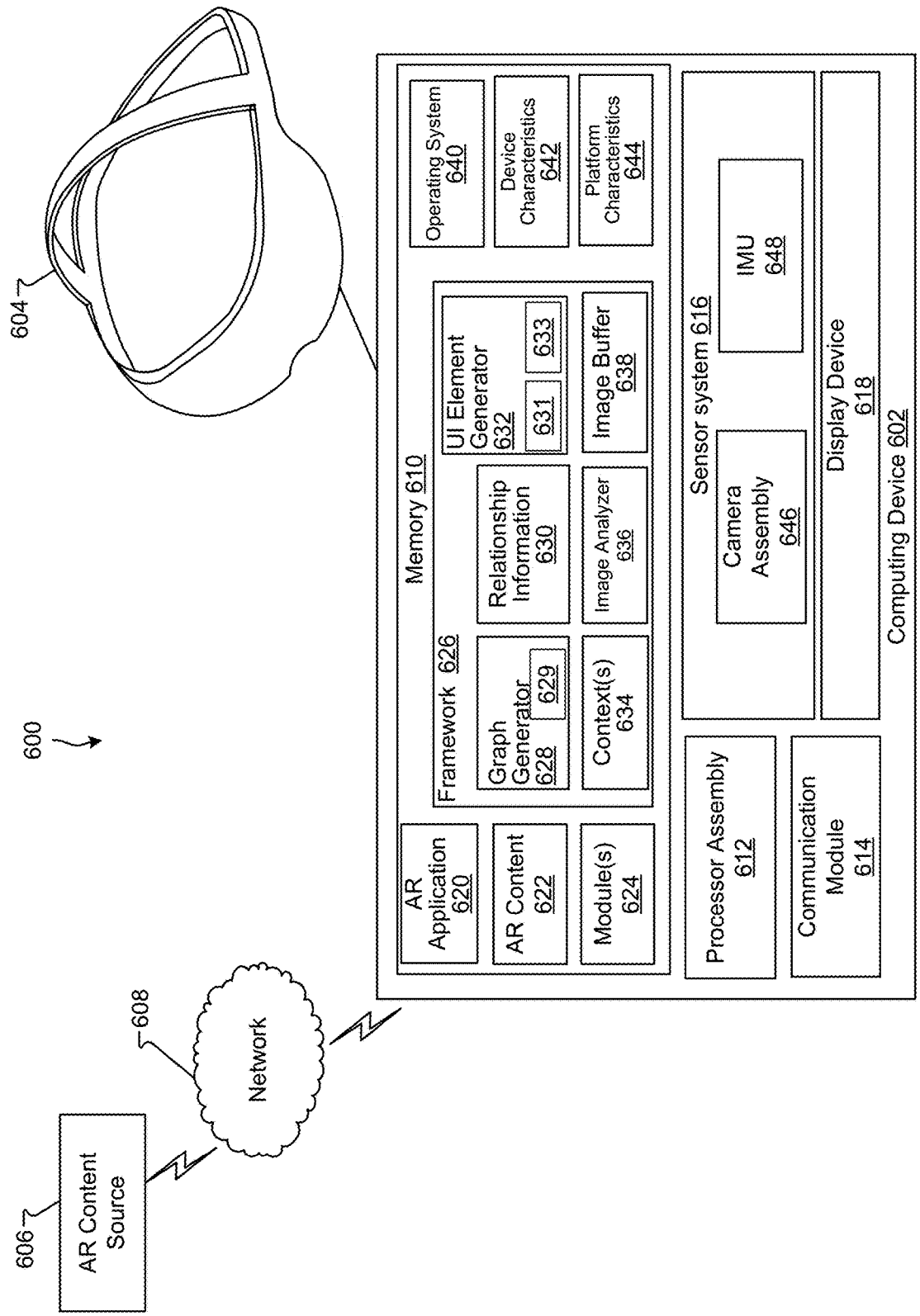
FIG. 6 is a block diagram illustrating a system according to an example implementation.

FIG. 6 is a block diagram illustrating a system 600 according to an example implementation. The system 600 can be configured to generate an augmented reality (AR) environment for a user of the system 600. In some implementations, the system 600 includes a computing device 602, a head-mounted display device (HMD) 604 or other display device (such as a display of the computing device 602), and an AR content source 606. Also shown is a network 608 over which the computing device 602 may communicate with the AR content source 606. A display device such as a mobile phone can be used instead of the HMD 604.

The computing device 602 may include a memory 610, a processor assembly 612, a communication module 614, a sensor system 616, and a display device 618. The memory 610 may include an AR application 620, AR content 622, modules 624, and a framework 626 capable of UI navigation modeling. The framework 626 includes a graph generator 628, relationship information 630, UI element generator 632, contexts 634, an image analyzer 636, and an image buffer 638. The memory 610 also includes or has access to operation system 640, device characteristics 642, and platform characteristics 644.

The computing device 602 may also include various user input components (not shown) such as a controller that communicates with the computing device 602 using a wireless communications protocol. In some implementations, the computing device 602 is a mobile device (e.g., a smart phone) which may be configured to provide or output AR content to a user via the HMD 604 and/or the display device 618. For example, in some implementations, the computing device 602 and the HMD 604 (or other display device) may communicate via a wired connection (e.g., a Universal Serial Bus (USB) cable) or via a wireless communication protocol (e.g., any Wi-Fi protocol, any Bluetooth protocol, ZigBee, etc.). In some implementations, the computing device 602 can be a component of the HMD 604 and may be contained within a housing of the HMD 604.

In some implementations, the AR application 620 may use the sensor system 616 to determine a location and orientation of a user within a physical space and/or to recognize features or objects within the physical space.

The AR application 620 may present or provide the AR content to a user via the HMD and/or one or more output devices of the computing device 602 such as the display device 618, speakers, and/or other output devices. In some implementations, the AR application 620 includes instructions stored in a memory 610 that, when executed by a processor assembly 612, cause the processor assembly 612 to perform the operations described herein. For example, the AR application 620 may generate and present an AR environment to the user based on, for example, AR content (e.g., AR objects), such as the AR content 622 and/or AR content received from the AR content source 606, and/or content received from modules 624. The AR content 622 and modules 624 may include UI content such as images or videos that may be displayed on a portion of the user's field of view in the HMD 604.

The AR environment may also include at least a portion of the physical (real-world) environment and physical (real-world) entities. For example, shadows may be generated so that the content better fits the physical space in which the user is located. The content may include objects that overlay various portions of the physical space. The content may be rendered as flat images or as three-dimensional (3D) objects. The 3D objects may include one or more objects represented as polygonal meshes. The polygonal meshes may be associated with various surface textures, such as colors and images.

Overlays, content layout, and other UI displays may be provided by the modules 624 accessed by operation system 640, for example, rather than provided by the AR application 620. The sensor system 616 may utilize camera assembly 646, context 634, relationship information 630, and image analyzer 636 to provide such content via the modules 624

The AR application 620 may use the image analyzer 636 and the image buffer 638 to generate images for display via the HMD 604 based on the AR content 622. For example, one or more images captured by the camera assembly 646 may be stored in the image buffer 638. In some implementations, the image buffer 638 is a region of the memory 610 that is configured to store one or more images. In some implementations, the computing device 602 stores images captured by the camera assembly 646 as a texture within the image buffer 638. Alternatively or additionally, the image buffer 638 may also include a memory location that is integral with the processor assembly 612, such as dedicated random access memory (RAM) on a GPU.

The image analyzer 636 may determine various properties of the image, such as the location of objects and UI surfaces upon which the content may be positioned. In some implementations, the image analyzer 636 may analyzer an image captured by camera assembly 646 as a basis for searching and obtaining additional related information to data represented by the captured image. Such related information can be utilized by system 600 to provide relevant facts, media, and other UI content associated with particular objects presented in the AR environment.

The modules 624 may function with graph generator 628 to determine and provide locations and layouts with which to insert AR content, such as an AR object (a sticker, a character, a sprite, etc.). For example, the modules 624 may prompt a user to identify a location for inserting the content and may then receive a user input indicating a location on the screen for the content. In some implementations, the user may indicate a location for placing AR content without being prompted. In some implementations, the device 602 can generate a UI layout that includes one or more UI content items arranged according to a spatial relationships described by a particular pattern in one or more graphs 629 that dictate rules and relationships to follow when providing UI content for a particular user accessing a particular AR environment.

The AR application 620 and/or modules 624 may update the AR environment based on input received from the camera assembly 646, the IMU 448, and/or other components of the sensor system 616. For example, the IMU 648 may detect motion, movement, and/or acceleration of the computing device 602 and/or the HMD 604. The IMU 648 may include various different types of sensors such as, for example, an accelerometer, a gyroscope, a magnetometer, and other such sensors. A position and orientation of the HMD 604 may be detected and tracked based on data provided by the sensors included in the IMU 648. The detected position and orientation of the HMD 604 may allow the system to detect and track the user's position and orientation within a physical space. Based on the detected position and orientation, the AR application 620 and/or modules 624 may update the AR environment to reflect a changed orientation and/or position of the user within the environment.

Although the computing device 602 and the HMD 604 are shown as separate devices in FIG. 6, in some implementations, the computing device 602 may include the HMD 604 (or other display device such as a mobile phone). In some implementations, the computing device 602 communicates with the HMD 604 via a cable, as shown in FIG. 6. For example, the computing device 602 may transmit video signals and/or audio signals to the HMD 604 for display for the user, and the HMD 604 may transmit motion, position, and/or orientation information to the computing device 602.

The AR content source 606 may generate and output AR content, which may be distributed or sent to one or more computing devices, such as the computing device 602, via the network 608. In an example implementation, the AR content includes three-dimensional scenes, facts, executable content, and/or images. Additionally, the AR content may include audio/video signals that are streamed or distributed to one or more computing devices. The AR content may also include the AR application 620 and/or modules 624 that run (execute) on the computing device 602 to generate 3D scenes, audio signals, and/or video signals.

The memory 610 can include one or more non-transitory computer-readable storage media. The memory 610 may store instructions and data that are usable to generate an AR environment for a user.

The processor assembly 612 includes one or more devices that are capable of executing instructions, such as instructions stored by the memory 610, to perform various tasks associated with generating an AR environment. For example, the processor assembly 612 may include a central processing unit (CPU) and/or a graphics processor unit (GPU). For example, if a GPU is present, some image/video rendering tasks, such as displaying AR objects, displaying aspects of elevating AR objects (such as displaying tether lines), generating shadows or shading polygons representing shadows of AR objects, etc., may be offloaded from the CPU to the GPU.

The communication module 614 includes one or more devices for communicating with other computing devices, such as the AR content source 606. The communication module 614 may communicate via wireless or wired networks, such as the network 608.

The sensor system 616 may include various sensors, such as a camera assembly 646. Implementations of the sensor system 616 may also include other sensors, including, for example, an inertial motion unit (IMU) 648, a light sensor, an audio sensor, an image sensor, a distance and/or proximity sensor, a contact sensor such as a capacitive sensor, a timer, and/or other sensors and/or different combination(s) of sensors.

The IMU 648 detects motion, movement, and/or acceleration of the computing device 602 and/or the HMD 604. The IMU 648 may include various different types of sensors such as, for example, an accelerometer, a gyroscope, a magnetometer, and other such sensors. A position and orientation of the HMD 604 may be detected and tracked based on data provided by the sensors included in the IMU 648. The detected position and orientation of the HMD 604 may allow the system to detect and track the user's gaze direction and head movement, or movement of the computing device 602.

The camera assembly 646 captures images and/or videos of the physical space around the computing device 602. The camera assembly 646 may include one or more cameras. The camera assembly 646 may also include an infrared camera.

The network 608 may be the Internet, a local area network (LAN), a wireless local area network (WLAN), and/or any other network. The computing device 602, for example, may receive the audio/video signals, which may be provided as part of AR content in an illustrative example implementation, via the network 608.

In some implementations, the system 600 may provide an architecture in which each unit of computing experience is divided from application based execution into module-based execution in which each module 624 can be flexibly combined with other modules to provide a coherent UI content experience for a user accessing the AR environment.

The rules and relationships described herein may be updated at runtime as a context of the user interaction changes. Similarly, the rules and relationships described herein may be updated at runtime as the context of the system (or platform running the system) changes. In addition, the rules and relationships described herein may be updated at runtime as UI content is changed, removed, or inserted into the AR environment.

Such rules and relationships may include semantic relationships between portions of UI content. The semantic relationships may be utilized to generate a graph for displaying UI content to provide an advantage of expressing a scene or an AR experience according to specific devices in use and/or the modality being employed by the user. System generated rules allow for AR experiences to be resumed on multiple computing devices without mobile devices or vice-versa. It allows the composition of UI from multiple processes is one screen. It allows re-interpretation of the layout to adapt to scene conditions. It allows developers to specify flexible, friendly semantic rules (adjacent, on top of, coplanar with) that the operating system takes care of resolving, in 3D relative to semantic objects. Semantic placement makes AR experience authoring much easier than having to specify transforms relative to the origin or the identified object.

Using rules and relationships in graphs 629, for example, to replace the application as the experience container can provide an advantage of providing user relevant information based on what a user is currently focused on. In addition, co-presentation of information may be relevantly tied to how particular content is related to each other or a parent content item.

In operation, the operating system 640 may use the framework to utilize UI content and layout rules defined by graph generator 628 and/or module 624 to provide an AR experience to a user. The UI element generator 632 can obtain the relationship information 630, device characteristics 642, and platform characteristics to generate the UI. The relationship information 630 may describe logical and/or semantic relationships between UI elements, AR objects, and/or physical objects for display on the computing device 602.

The relationships may be one or more of dependence, hierarchy, or similarity among UI elements and/or content being presented within UI elements. For example, a relationship between two UI elements may be a parent and child relationship where a first UI element is a parent and a second UI element is a child that is shown in response to a user interacting with the first UI element. In another example, a relationship between two UI elements may be co-planar in which a first UI element and a second UI element are shown in response to interactions that are not dependent on one another. In yet another example, a relationship between two UI elements may be a dependent relationship in which a second UI element is displayed when the first UI element is displayed. In some implementations, a relationship between two UI elements may be an arbitrary relationship in which a first UI element and a second UI element may have an embedded relationship in which a first UI element is embedded within a second UI element. In some implementations, a relationship between two UI elements may have a control relationship where a first UI element controls a second UI element.

In general, the system 600 may present experiences in the AR environment that organize modules of functionality (e.g., modules 624). A number of layers of structure may be used to generate such modules 624. The modules 624 may be used to provide a presentation (e.g., layout) of UI content and a navigation model with which to drill into the UI content. The layers of structure may include shells in a UI stack that function to provide the UI content and navigation model. In some implementations, any number of shells can be replaced in the UI stack to customize a particular user experience. For purposes of simplifying the drawing, the shells are not depicted in the system of FIG. 6.

The framework 626 may generate graphs 628 that carry out the algorithms of the modules. The framework 626 can take into account data from the operating system 640, the device characteristics 642, the platform characteristics 644, and any derived contexts 634 associated with such characteristics and/or the user. Such data may be used to operate within the shells of the UI stack to provide the UI content. In general, an experience shell may encompass all other shells that provide the user experience with the UI content in the AR environment.

In some implementations, a device shell may represent a lowest layer in the UI stack. The device shell may allow users to perform actions such as logging in and/or authenticating use of the AR environment and/or affordances associated with such an environment. A user shell may represent a main UI layer. The user shell represents what a user views once logged in. The user shell provides system UI settings, search areas, start and stop experience controls, and navigation controls.

Modules 624 may execute in the experience shell and may use UI element generator 632 to generate UI elements on surfaces of AR objects. Modules 624 may be a smallest unit of computation utilizing the UI stack. The layout of the surfaces may be generated by the experience shell. Each experience in a user shell delegates space to the experience shell in order to allow the experience shell to arrange surfaces.

One or more graphs 629 may be used to assemble a particular scene for rendering in the AR environment. For example, a graph may define which surfaces of AR objects to provide UI content upon. A graph may also define how different UI content items may be assembled into a layout. Although each graph 629 depicts a flow of UI content connections with parent-child relationships, portions of the AR experience may not be aware of other portions of the AR experience. For example, a parent node may be aware of placement of a child node owned by the parent node, but the child may not be aware of the parent node. In some implementations, none of the nodes of a graph are aware of content provided by other nodes of the graph. Thus, each layer (i.e., shell) may operate as isolated processes.

In some implementations, system 600 may provide and enforce consistency of experience across a particular operating system 640. For example, any number of user shells and modules 624 may be developed by any number of developers and may be swapped in or out to provide a consistent navigation of UI content for both users and developers. This can ensure that customization of AR experiences may be allowed, but the overarching AR experience shell may be used to provide a consistent navigation paradigm in the operating system regardless of the author of a particular user shell or module. Using the same AR experience shell may also enforce a consistent approach to presentation of AR experiences in single, sequential or multi-device modes. Similarly, consistent application programming interfaces may be provided to developers for how to express presentational relationships between modules. In some implementations, using the same AR experience shell may provide consistent interaction with respect to physics laws, timing, display layout, etc.

In general, the framework 626 can enable users to pick-up and put-down AR experiences quickly and easily across device using the modules 422 described herein. Presentation requirements may be stored in an experience state that may be synchronized across devices.

The experience state may include relationship information 630 that may encompass one or more graphs 629, a focus history, and a stack of dismissed surfaces. The focus history and stack of dismissed surfaces may be defined as a context 634. The graph 629 may define a hierarchy of how particular UI elements/content may be placed in the AR environment. In particular, each graph 629 may describe a collection of surfaces in an AR experience and the relationships between such surfaces. The surfaces may be represented as or on AR objects in the AR environment. Each graph includes nodes and edges in which the nodes of the graph represent surfaces and the edges encode semantic relationships between a parent node and a child node.

The focus history may describe which module 624 was most focused in the experience. The stack of dismissed surfaces may represent which of the surfaces the user has dismissed from view. A focus stack is a list recording an order in which non-dismissed modules were most recently focused. A dismissed stack may represent a list recording the order in which surfaces present in the experience were dismissed from view by the user.

In some implementations, the relationship information 630 represents semantic relationships that are opinions expressed by parent nodes to child nodes with respect to how the content associated with the parent node is to be presented relative to a particular child node. Such relationships are defined by system 600 as opinions because while the system attempts to satisfy the relationships, a constraint in the experience may not allow fulfillment of such opinions.

In some implementations, a visual notation of the graph 629 may be used to describe experience relationships. Semantic relationships may be expresses in at least two dimensions including presentation and dependency. The presentation may capture one or more opinions about layout of particular UI content. Expressions for such opinions can include, but are not limited to none (e.g., indifference, no opinion), co-present (e.g., prefer to be shown simultaneously with my child), sequential (e.g., prefer my child not be shown with me—may result in full-screen transition), and/or on top (e.g., prefer my child be placed exactly where I am, above me, in the experience).

The dependency captures a surface dismiss dependency indicating whether dismissing the parent should also dismiss the child. The expressions for such dependency may include, but are not limited to none (e.g., my child is independent from me, if I am dismissed they are not affected), dependent (e.g., my child is dependent on me, if I am dismissed, they are also dismissed).

In addition to the surface presentations described above, the AR experience shell can receive signals from module authors through a module manifest. The module manifest may facilitate received suggestions. For example, when a user accepts a suggestion that is surfaced through the system 600, the module(s) 624 currently presented on screen may not be aware of the newly launched module. Thus, module (s) on screen are unable to express an opinion on how this new module should be composed. In the absence of this signal, modules that serve specific purposes may not be properly presented. For example, a captions module may be suggested to augment a video viewing experience. While the video playback module may not be aware of this module, the AR experience shell should understand that the captions should be displayed below the video. To achieve this, the captions module author can specify a composition pattern. A composition pattern may be defined as a set of possible values that the AR experience shell may understand and use to compose a particular module with a specified parent node. Supported patterns may include, but are not limited to a ticker and a comments-right pattern. The ticker pattern indicates to compose the module beneath the parent node. The ticker may be used in the captions or a stock ticker modules. The comments-right pattern indicates that the module should compose comments to the right of the parent.

In some implementations, system 600 may utilize containers. Containers represent experimental a-priori, developer created, specified layouts of multiple modules on a single screen. A container may include any number of UI content items provided by a module that may be provided by an application that has strong opinions about how content should be arranged in the AR environment. Containers aim to allow launching of multiple modules at once and allow specification of different arrangements of surfaces that the modules create for different screen sizes, for example. In some implementations, the module specifications are interpreted at runtime by the AR experience shell, which then converts the module specifications into an exact same kind of surface as other defined surface relationships with the same physics, interactions, gesture affordances, and the like, to ensure that a particular container integrates seamlessly with non-container modules.

In some implementations, the system 600 may ensure that modules can be added and removed ad-hoc (at runtime). Each shell may compose surfaces made by modules that have no awareness of one another. In some implementations, an intent may be resolved to different modules for different users. Developers should be provided a way to write modules without having to take into account device classes or screen sizes.

In some implementations, the system 600 may take into account privacy. For example, modules may provide sandboxing of information to increase privacy. The software performing object recognition can be granted privileged access to a camera scene to create semantic annotations (e.g., labelling features or mesh regions with standardized schema labels), but such software may not have a need to utilize visibility on what the system or the user does with those labels.

In such an example, a (trusted) operating system can then suggest modules that may act upon these entities. The modules can start and express a desired semantic relationship to this content (e.g. overlay) and provide UI content to the (trusted) AR experience shell. The AR experience shell can then arrange the UI content at the correct coordinates in the scene without having to provide the modules access to scene information. The AR experience shell needs no access to the UI contents of the module because layout (e.g., arrangement) of the UI content is performed using metadata.

The architecture described for system 600 utilizes a unified, operating system-wide scene graph. The AR experience shell may arrange the position of modules participating in an experience in this scene graph. The modules need not be aware of one another, and can be drawn by separate processes. For a given user, the suggested modules may differ, as might subsequent suggested next steps based on the new context, semantics, and modules. Such a system facilitates the layout and creation of tailored AR experiences. Users may be able to request specific modules to add to their experiences and themselves build custom experiences.

Metrics may be gathered by the system 600 to observe interesting new combinations in frequent use, and make better suggestions based on these metrics. In addition, the system 600 may be able to leverage 2D content in a 3D context. For example, because modules are insulated from their running context, the system 600 can use information and/or UI content associated with modules, which may have been written exclusively for presentation in 2D, by presenting the information and/or UI content as 2D planar objects in 3D. The opinion about placement of the information and/or UI content relative to 3D objects can be introduced by the modules (e.g., agent) suggesting them, which can be aware they are native-2D, and suggest appropriate presentation opinions. Alternatively, the system 600 may override defaults to provide appropriate layouts for 2D objects.

A two-dimensional AR experience may provide a consistent presentation and navigation paradigm on experiences accessed in 2D independent of device size or device type (e.g., laptop, television, countertop device with screen, mobile phone, etc.). The AR experience in 2D may be used as a placeholder where a 3D scene may be placed. For example, the system 600 may provide a loose semantic link between all the UI elements and the real world object, so that the real world object can be replaced with a view of that object using 3D content (e.g., Google Earth content, image capture of the object while the original experience was being served, etc.).

In some implementations, the system 600 can provide specific modules for particular devices based on device characteristics 423. For example, the semantic labeling of nodes and relationships may allow the system 600 to present some new modules on a mobile device rather than on an AR display or vice-versa, because particular modules may be suited to devices with touch-screens.

In some implementations, the systems described herein may generate one or more new layouts for UI content. With the addition of new UI content (represented as nodes and/or relationships) for the layout, the systems may prompt a user to manually place the UI content in a scene of the AR environment, rather than utilizing system-generated layout.

Figure 7:
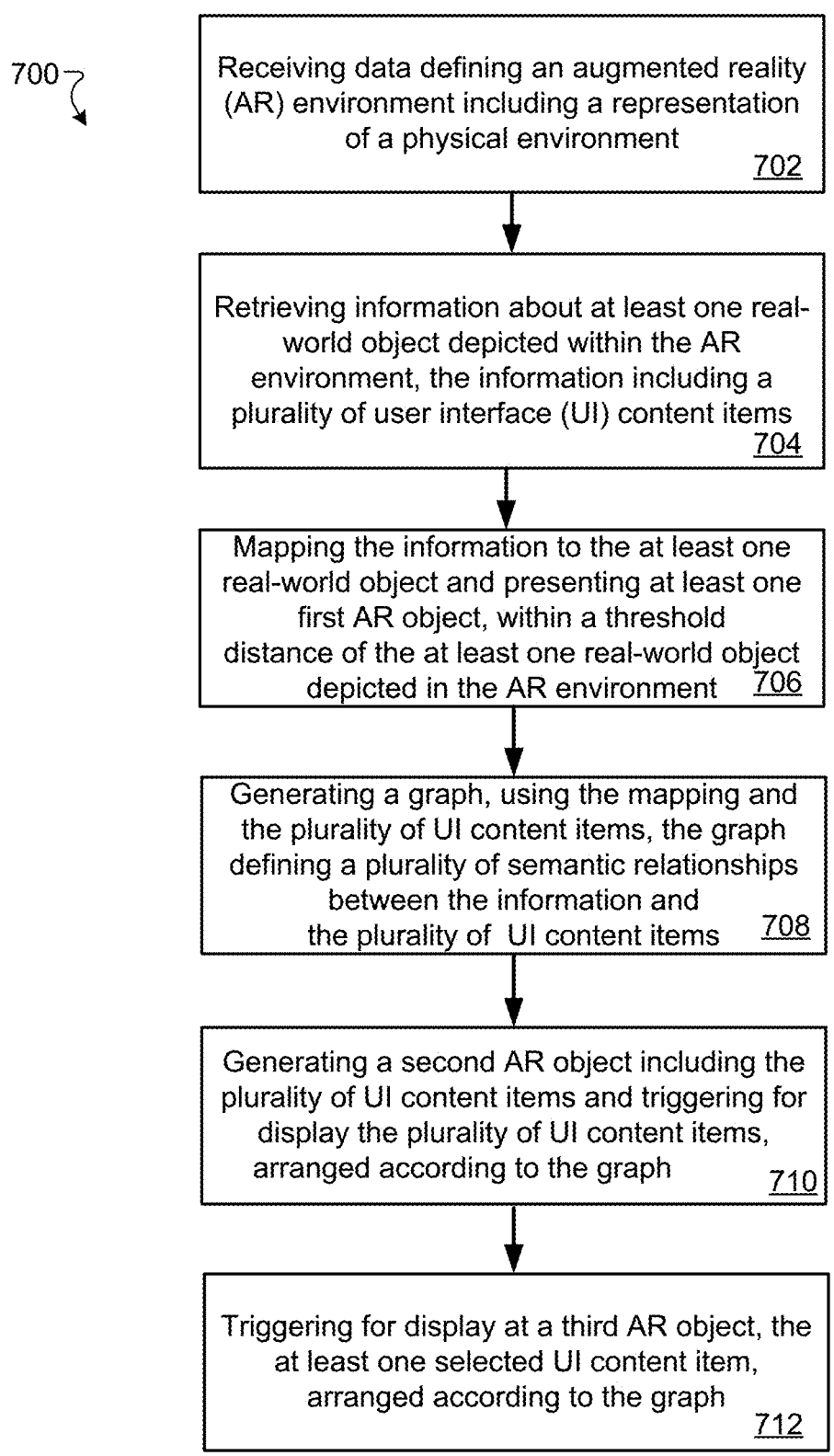
FIG. 7 is a flow chart diagramming one example of a process to place UI content, according to implementations described throughout this disclosure.

FIG. 7 is a flow chart diagramming one example of a process 700 to place UI content, according to implementations described throughout this disclosure. As shown at block 702, a computing device 602 may receive data defining an AR environment. The AR environment includes a representation of a physical environment. The data may include instructions for rendering and compositing a plurality of AR objects in the AR environment.

At block 704, the process 700 includes retrieving information about at least one real-world object depicted within the AR environment. For example, as shown in FIG. 1A, a painting 110 is a real world object and the representation 110A is shown in the AR environment 102. The retrieved information may include a plurality of UI content items that are associated with the at least one real-world object. In some implementations, the plurality of UI content items may include any number of 2D and/or 3D images, video, panels, applications, interactive controls or containers, facts, labels, and the like. In operation, the information may be retrieved from online or offline sources. In some implementations, the information is obtained from one or more online sources based on a captured image of the real-world object. For example, computing device 602 may include a camera assembly 646 that may capture an image of a real-world object. The image analyzer 636 may analyze the image and may query online sources to determine additional data about the real-world object (e.g., the painting).

At block 706, the process 700 includes mapping the information to the at least one real-world object and presenting at least one first AR object, within a threshold distance of the at least one real-world object depicted in the AR environment. For example, framework 626 may utilize the image analyzer 636 to determine how the information is related to the real-world object. The mapping may include generating one or more semantic labels corresponding to the real-world object. In this example, the painting 110 was mapped to information from a website that determined that the object is a painting with a particular name and creator. The system 600 then generated a semantic label 114 and may provide an affordance on an AR object.

In some implementations, each semantic relationship in a graph indicates at least a placement indication and a scale indication associated with at least one of the plurality of UI content items. The placement indication provides locational and/or hierarchical data for where the UI content should be located with respect to other UI content and/or AR objects. The scale indication provides size information to indicate whether or not a UI content item should be scaled to another UI content item, AR object, or other feature in the AR environment. In some implementations, the plurality of semantic relationships indicate opinions associated with a layout of at least one of the plurality of UI content items and the display of AR objects in the AR environment is based at least in part on the opinions. The opinions may be provided by developers or users. In some implementations, the opinions may be based on a parent UI content item having particular requirements for layout.

At block 708, the process 700 includes generating a graph, using the mapping and the plurality of UI content items. For example, the graph generator 628 may use module 624 information, context information 634, UI element generator 632, device characteristics 642, and platform characteristics 644 to determine a layout for the UI content items. The graph may define a plurality of semantic relationships between the information and the plurality of UI content items. For example, as shown in the graph 120 of FIG. 1B, the node 122 represents the AR object shown by representation 110A indicated in the graph as a painting scene object. The relationship edge 124 represents a semantic relationship indicating that the content represented by node 122 is to be placed adjacent to, co-planar with, and scaled to content represented by node 126. The node 126 represents an information surface, such as an additional surface (e.g., AR object) that is presented near the representation 110A in the AR environment.

At block 710, the process 700 includes generating a second AR object including the plurality of UI content items and triggering for display at the second AR object, the plurality of UI content items, arranged according to the graph, in response to receiving a selection of the first AR object. The framework 626 may trigger the graph generator 628 to place content depending on a particular selection. The graph 629 may trigger the layout. For example, the graph 220 shown in FIG. 2B includes the node 226 which represents an information surface (for an AR object), such as UI content 202 that is presented near the representation 110A of painting 110 in the AR environment 102. Graph 220 defines a semantic relationship indicating that the representation 110A (node 222) is to be placed adjacent to, co-planar with, and scaled to any information surface (node 226) that is provided with representation 110A. The relationship edge 228 indicates that any content item depicted with content represented by node 226 should be co-present with the content represented by node 226. The graph 220 indicates a node 230 represents video content item A 204 as a video interview surface that should be co-present with content represented by node 226. Thus, the video content item A 204 may be provided in the AR environment 102 co-present to UI content 202, as shown in FIG. 3A by video depicting content item A 204A.

At block 712, the process 700 includes triggering for display at a third AR object, the at least one selected UI content item, arranged according to the graph, in response to receiving a selection of at least one of the plurality of UI content items depicted at the second AR object. The framework 626 may trigger the graph generator 628 to place content depending on a particular selection of UI content. The graph 629 may trigger the layout. For example, the graph 320 shown in FIG. 3B defines that the representation 110A (node 322) is to be placed adjacent to, co-planar with, and scaled to any information surface (node 326) that is provided with representation 110A. The relationship edge 328 indicates that any content item depicted with content represented by node 326 should be co-present with the content represented by node 326. Here, the graph 320 indicates a node 330 represents video content item A 204 as a video interview surface that should be co-present with content represented by node 326. Thus, the video content item A 204 may be provided in the AR environment 102 co-present to UI content 202, as shown in FIGS. 3A and 4A by video depicting content item A 204A.

In some implementations, the process 700 also includes triggering for display at another AR object, the additional selected UI content item, arranged according to the graph, in response to receiving an additional selection of at least one of the plurality of UI content items. The framework 626 may trigger the graph generator 628 to place content depending on a particular selection of UI content. The graph 629 may trigger the layout. For example, the graph 520 shown in FIG. 5B depicts a relationship edge 540 that indicates that the representation 110A (node 522) is to be placed adjacent to, co-planar with, and scaled to any 3D comic content (node 542) that is provided with representation 110A.

In some implementations, each AR object is associated with at least one user interface layout on a surface configured according to the graph and within a region in the AR environment. For example, an AR object may be provided as a surface in which to present UI content in the AR environment. A graph may be generated according to the UI content type, the user context, the platform, operating system, or device context, or other input. In general, each graph includes one or more semantic labels assigned to at least one UI content item. The semantic label may be derived from obtained online or offline data, and/or developer or user generated.

In some implementations, the at least one user interface element is three-dimensional and configured as three-dimensional AR content in the AR environment. For example, the carousel UI content 302A is shown as a 3D object that can be selected and scrolled.

Figure 8:
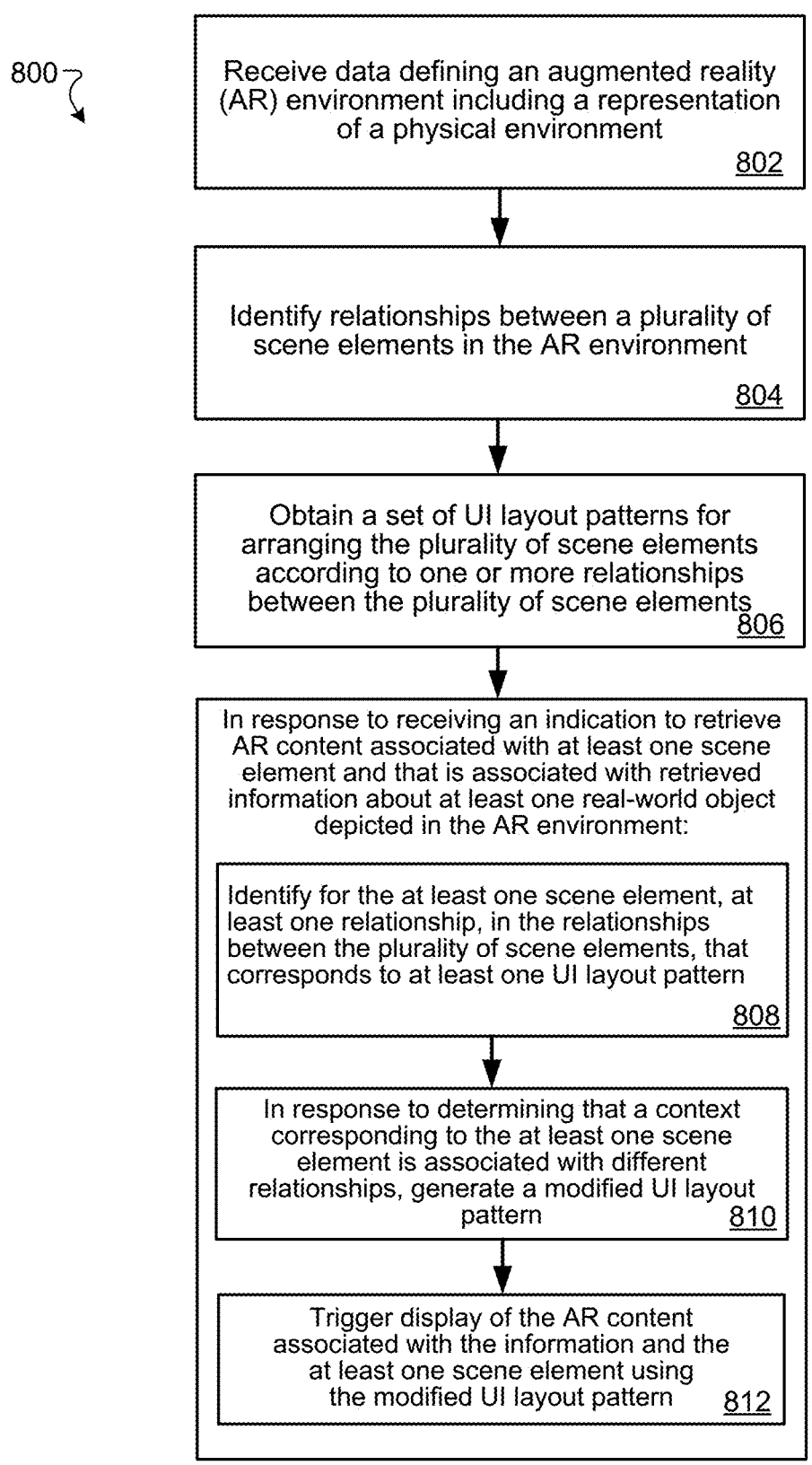
FIG. 8 is a flow chart diagramming one example of a process to place UI content, according to implementations described throughout this disclosure.

FIG. 8 is a flow chart diagramming one example of a process 800 to place UI content, according to implementations described throughout this disclosure. At block 802, the process 800 includes receiving, by a computing device, data defining an augmented reality (AR) environment including a representation of a physical environment. The data may include instructions for rendering and compositing a plurality of AR objects in the AR environment.

At block 804, the process 800 includes identifying, by the computing device, relationships between a plurality of scene elements in the AR environment. For example, each relationship may be a semantic relationship between a plurality of scene elements which may be represented in a semantic graph. The semantic graph may include a plurality of multi-dimensional nodes and edges. Each node in the semantic graph represents at least one scene element. Each edge between two or more nodes represents one or more relationships between the plurality of scene elements. The framework 626 may include or have access to modules 624 which may be used to generate and/or update relationships in the semantic graphs 629.

In some implementations, each semantic relationship in a graph indicates at least a placement indication and a scale indication associated with at least one of the plurality of UI content items. The placement indication provides locational and/or hierarchical data for where the UI content should be located with respect to other UI content and/or AR objects. The scale indication provides size information to indicate whether or not a UI content item should be scaled to another UI content item, AR object, or other feature in the AR environment. In some implementations, the plurality of semantic relationships indicate opinions associated with a layout of at least one of the plurality of UI content items and the display of AR objects in the AR environment is based at least in part on the opinions. The opinions may be provided by developers or users. In some implementations, the opinions may be based on a parent UI content item having particular requirements for layout.

At block 806, the process 800 includes obtaining, by the computing device, a set of UI layout patterns 631 for arranging the plurality of scene elements 633 in the AR environment according to one or more relationships between the plurality of scene elements 633. The UI layout patterns 631 and scene elements 633 may be accessed and/or generated by UI element generator 632. In some implementations, the scene elements are three-dimensional and configured to present three-dimensional AR content in the AR environment.

At block 808, in response to receiving an indication to retrieve AR content 622 that is associated with at least one scene element 633 in the plurality of scene elements and that is associated with retrieved information about at least one real-world object depicted in the AR environment (e.g., shown by painting 110A), the framework 626 may identify for the at least one scene element, at least one relationship that corresponds to at least one UI layout pattern. In some implementations, the indication to retrieve the information about the at least one real-world object is based on a triggered indicator provided in the AR environment. The indicator may provide functionality to access the information based on a UI layout pattern associated with the semantic graph. In some implementations, the indication to retrieve the AR content associated with the at least one scene element is triggered by an audio cue received from a user accessing the AR environment. The audio cue may indicate that the at least one scene element is interactive.

In some implementations, retrieving the information about the at least one real-world object depicted within the AR environment occurs in response to the framework 626 recognizing the at least one real-world object. In some implementations, the information may be retrieved from online sources based on a captured image of the real-world object.

At block 810, the framework 626 may generate a modified UI layout pattern for the at least one scene element using the different relationships, in response to determining that a context corresponding to the at least one scene element is associated with different relationships. In some implementations, the modified UI layout pattern may be generated in response to the framework 626 identifying additional AR content for display in the AR environment. The framework 626 may then add an additional node corresponding to an additional scene element to be represented in the semantic graph and may add at least one additional edge from the additional node to another node of the semantic graph. The additional edge represents a new relationship between the additional node and the other node of the semantic graph. The updated graph may be used to provide the AR content according to a UI layout pattern generated to arrange the AR content in the AR environment on the additional scene element and according to the new relationship.

At block 812, the framework 626 may trigger display of the AR content associated with the information and the at least one scene element using the modified UI layout pattern. For example, the context corresponding to the at least one scene element may be determined based on a device used to access the AR environment. That is, a user may be accessing content on a first device and may switch to a smaller device to continue accessing the content. The framework 626 may be used to assess the context change and may trigger an updated UI layout pattern for displaying the content (and any new content) in the smaller device screen. Similarly, the context may be determined based on a user accessing the AR environment using user preferences, for example. In addition, the context may be determined based on the AR environment and/or content depicted in the AR environment. In response to determining that a context corresponding to the at least one scene element is associated with different relationships, the framework 626 may update the semantic graph to include the modified UI layout pattern for the at least one scene element.

Figure 9:
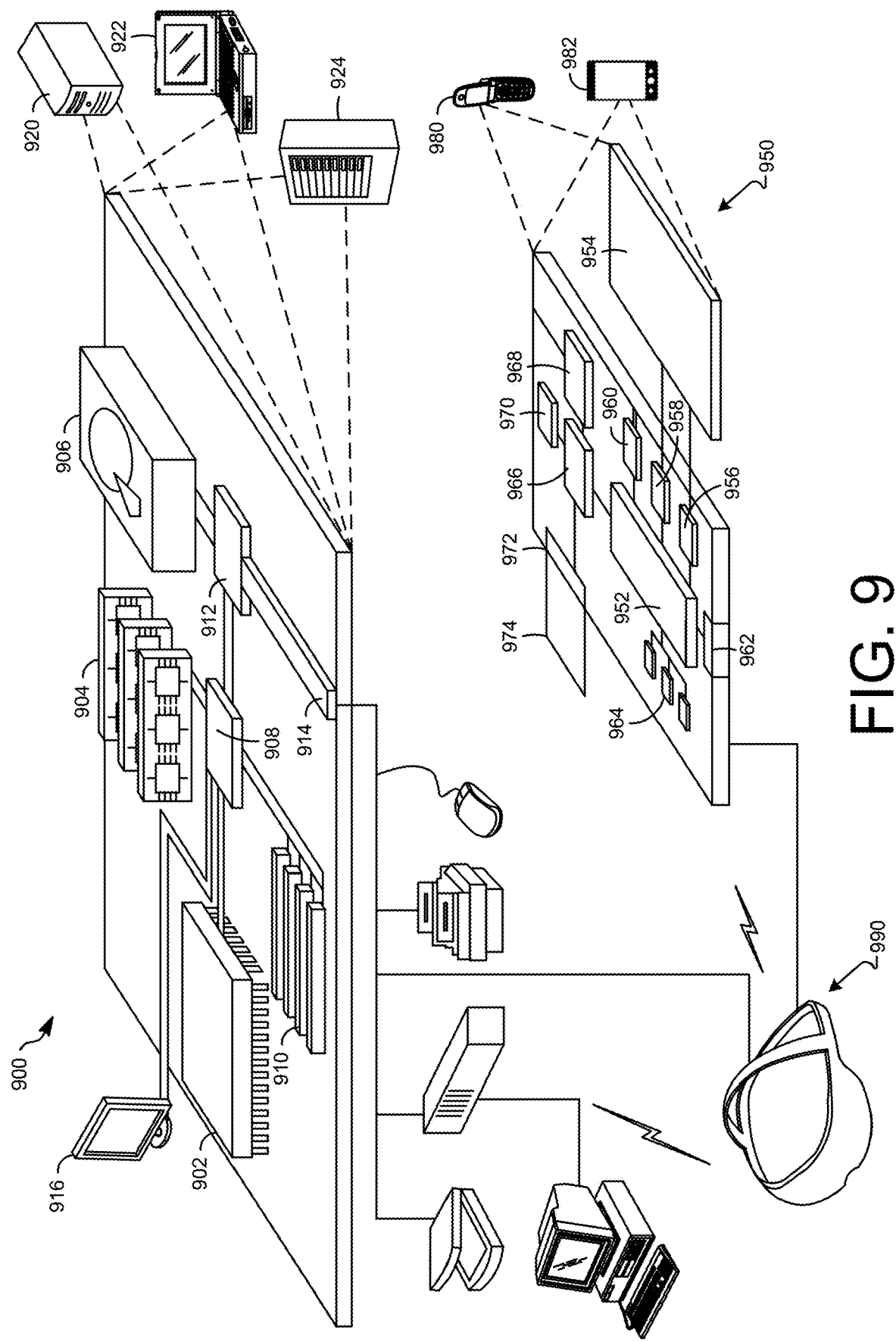
FIG. 9 shows an example of a computer device and a mobile computer device that can be used to implement the techniques described herein.

FIG. 9 shows an example of a computer device and a mobile computer device that can be used to implement the techniques described here. FIG. 9 shows an example of a computer device 900 and a mobile computer device 950, which may be used with the techniques described here. Computing device 900 is intended to represent various forms of digital computers, such as laptops, desktops, tablets, workstations, personal digital assistants, televisions, servers, blade servers, mainframes, and other appropriate computing devices. Computing device 950 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device 900 includes a processor 902, memory 904, a storage device 906, a high-speed interface 909 connecting to memory 904 and high-speed expansion ports 910, and a low speed interface 912 connecting to low speed bus 914 and storage device 906. The processor 902 can be a semiconductor-based processor. The memory 904 can be a semiconductor-based memory. Each of the components 902, 904, 906, 909, 910, and 912, are interconnected using various busses, and may be mounted on a common motherboard or in other manners as appropriate. The processor 902 can process instructions for execution within the computing device 900, including instructions stored in the memory 904 or on the storage device 906 to display graphical information for a GUI on an external input/output device, such as display 916 coupled to high speed interface 909. In other implementations, multiple processors and/or multiple buses may be used, as appropriate, along with multiple memories and types of memory. Also, multiple computing devices 900 may be connected, with each device providing portions of the necessary operations (e.g., as a server bank, a group of blade servers, or a multi-processor system).

The memory 904 stores information within the computing device 900. In one implementation, the memory 904 is a volatile memory unit or units. In another implementation, the memory 904 is a non-volatile memory unit or units. The memory 904 may also be another form of computer-readable medium, such as a magnetic or optical disk.

The storage device 906 is capable of providing mass storage for the computing device 900. In one implementation, the storage device 906 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 904, the storage device 906, or memory on processor 902.

The high speed controller 909 manages bandwidth-intensive operations for the computing device 900, while the low speed controller 912 manages lower bandwidth-intensive operations. Such allocation of functions is exemplary only. In one implementation, the high-speed controller 909 is coupled to memory 904, display 916 (e.g., through a graphics processor or accelerator), and to high-speed expansion ports 910, which may accept various expansion cards (not shown). In the implementation, low-speed controller 912 is coupled to storage device 906 and low-speed expansion port 914. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 900 may be implemented in a number of different forms, as shown in the figure. For example, it may be implemented as a standard server 920, or multiple times in a group of such servers. It may also be implemented as part of a rack server system 924. In addition, it may be implemented in a personal computer such as a laptop computer 922. Alternatively, components from computing device 900 may be combined with other components in a mobile device (not shown), such as device 950. Each of such devices may contain one or more of computing device 900, 950, and an entire system may be made up of multiple computing devices 900, 950 communicating with each other.

Computing device 950 includes a processor 952, memory 964, an input/output device such as a display 954, a communication interface 966, and a transceiver 969, among other components. The device 950 may also be provided with a storage device, such as a microdrive or other device, to provide additional storage. Each of the components 950, 952, 964, 954, 966, and 969, are interconnected using various buses, and several of the components may be mounted on a common motherboard or in other manners as appropriate.

The processor 952 can execute instructions within the computing device 950, including instructions stored in the memory 964. The processor may be implemented as a chipset of chips that include separate and multiple analog and digital processors. The processor may provide, for example, for coordination of the other components of the device 950, such as control of user interfaces, applications run by device 950, and wireless communication by device 950.

Processor 952 may communicate with a user through control interface 959 and display interface 956 coupled to a display 954. The display 954 may be, for example, a TFT LCD (Thin-Film-Transistor Liquid Crystal Display) or an OLED (Organic Light Emitting Diode) display, or other appropriate display technology. The display interface 956 may comprise appropriate circuitry for driving the display 954 to present graphical and other information to a user. The control interface 959 may receive commands from a user and convert them for submission to the processor 952. In addition, an external interface 962 may be provide in communication with processor 952, so as to enable near area communication of device 950 with other devices. External interface 962 may provide, for example, for wired communication in some implementations, or for wireless communication in other implementations, and multiple interfaces may also be used.

The memory 964 stores information within the computing device 950. The memory 964 can be implemented as one or more of a computer-readable medium or media, a volatile memory unit or units, or a non-volatile memory unit or units. Expansion memory 974 may also be provided and connected to device 950 through expansion interface 972, which may include, for example, a SIMM (Single In Line Memory Module) card interface. Such expansion memory 974 may provide extra storage space for device 950, or may also store applications or other information for device 950. Specifically, expansion memory 974 may include instructions to carry out or supplement the processes described above, and may include secure information also. Thus, for example, expansion memory 974 may be provide as a security module for device 950, and may be programmed with instructions that permit secure use of device 950. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 964, expansion memory 974, or memory on processor 952, that may be received, for example, over transceiver 969 or external interface 962.

Device 950 may communicate wirelessly through communication interface 966, which may include digital signal processing circuitry where necessary. Communication interface 966 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 969. In addition, short-range communication may occur, such as using a Bluetooth, Wi-Fi, or other such transceiver (not shown). In addition, GPS (Global Positioning System) receiver module 970 may provide additional navigation- and location-related wireless data to device 950, which may be used as appropriate by applications running on device 950.

Device 950 may also communicate audibly using audio codec 960, which may receive spoken information from a user and convert it to usable digital information. Audio codec 960 may likewise generate audible sound for a user, such as through a speaker, e.g., in a handset of device 950. Such sound may include sound from voice telephone calls, may include recorded sound (e.g., voice messages, music files, etc.) and may also include sound generated by applications operating on device 950.

The computing device 950 may be implemented in a number of different forms, as shown in the figure. For example, it may be implemented as a cellular telephone 990. It may also be implemented as part of a smart phone 992, personal digital assistant, or other similar mobile device.

A user can interact with a computing device using a tracked controller 994. In some implementations, the controller 994 can track the movement of a user's body, such as of the hand, foot, head and/or torso, and generate input corresponding to the tracked motion. The input can correspond to the movement in one or more dimensions of motion, such as in three dimensions. For example, the tracked controller can be a physical controller for a VR application, the physical controller associated with one or more virtual controllers in the VR application. As another example, the controller 994 can include a data glove.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

In some implementations, the computing devices depicted in FIG. 5 can include sensors that interface with a virtual reality (VR headset 995). For example, one or more sensors included on a computing device 950 or other computing device depicted in FIG. 5, can provide input to VR headset 995 or in general, provide input to an AR and/or VR space.

The sensors can include, but are not limited to, a touchscreen, accelerometers, gyroscopes, pressure sensors, biometric sensors, temperature sensors, humidity sensors, and ambient light sensors. The computing device 950 can use the sensors to determine an absolute position and/or a detected rotation of the computing device in the AR and/or VR space that can then be used as input to the AR and/or VR space. For example, the computing device 950 may be incorporated into the AR and/or VR space as a virtual object, such as a controller, a laser pointer, a keyboard, a weapon, etc. Positioning of the computing device/virtual object by the user when incorporated into the AR and/or VR space can allow the user to position the computing device to view the virtual object in certain manners in the AR and/or VR space. For example, if the virtual object represents a laser pointer, the user can manipulate the computing device as if it were an actual laser pointer. The user can move the computing device left and right, up and down, in a circle, etc., and use the device in a similar fashion to using a laser pointer.

In some implementations, one or more input devices included on, or connect to, the computing device 950 can be used as input to the AR and/or VR space. The input devices can include, but are not limited to, a touchscreen, a keyboard, one or more buttons, a trackpad, a touchpad, a pointing device, a mouse, a trackball, a joystick, a camera, a microphone, earphones or buds with input functionality, a gaming controller, or other connectable input device. A user interacting with an input device included on the computing device 950 when the computing device is incorporated into the AR and/or VR space can cause a particular action to occur in the AR and/or VR space.

In some implementations, a touchscreen of the computing device 950 can be rendered as a touchpad in VR space. A user can interact with the touchscreen of the computing device 950. The interactions are rendered, in VR headset 995 for example, as movements on the rendered touchpad in the AR and/or VR space. The rendered movements can control objects in the AR and/or VR space.

In some implementations, one or more output devices included on the computing device 950 can provide output and/or feedback to a user of the VR headset 995 in the AR and/or VR space. The output and feedback can be visual, tactical, or audio. The output and/or feedback can include, but is not limited to, vibrations, turning on and off or blinking and/or flashing of one or more lights or strobes, sounding an alarm, playing a chime, playing a song, and playing of an audio file. The output devices can include, but are not limited to, vibration motors, vibration coils, piezoelectric devices, electrostatic devices, light emitting diodes (LEDs), strobes, and speakers.

In some implementations, the computing device 950 may appear as another object in a computer-generated, 3D environment. Interactions by the user with the computing device 950 (e.g., rotating, shaking, touching a touchscreen, swiping a finger across a touch screen) can be interpreted as interactions with the object in the AR and/or VR space. In the example of the laser pointer in an AR and/or VR space, the computing device 950 appears as a virtual laser pointer in the computer-generated, 3D environment. As the user manipulates the computing device 950, the user in the AR and/or VR space sees movement of the laser pointer. The user receives feedback from interactions with the computing device 950 in the AR and/or VR space on the computing device 950 or on the VR headset 995.

A number of embodiments have been described. Nevertheless, it will be understood that various modifications may be made without departing from the spirit and scope of the invention.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A method comprising:
   receiving, by a computing device, data defining an augmented reality (AR) environment including a representation of a physical environment;
   presenting an affordance associated with at least one real-world object depicted in the AR environment, the at least one real-world object and the affordance being included in a plurality of scene elements; and
   in response to selection of the affordance, retrieve AR content associated with at least one scene element from the plurality of scene elements and associated with information retrieved about the at least one real-world object, retrieving the AR content including:
      identifying, for the at least one scene element, at least one relationship that corresponds to a UI layout pattern, the UI layout pattern including a sematic graph including a plurality of nodes and a plurality of edges corresponding with the plurality of scene elements and a plurality of relationships between the plurality of scene elements, the affordance providing functionality to access the AR content based on the semantic graph;
      generating a modified UI layout pattern for the at least one scene element using a different relationship than the identified at least one relationship based on determining that a context corresponding to the at least one scene element is associated with the different relationship; and
      triggering, by the computing device, display of the AR content associated with the information in place of the affordance and display of the at least one scene element using the modified UI layout pattern.

2. The method of claim 1, wherein:
   the context corresponding to the at least one scene element is determined based on a user accessing the AR environment,
   the context corresponding to the at least one scene element is determined based on a device used to access the AR environment, or
   the context corresponding to the at least one scene element is determined based on the AR environment.

3. The method of claim 1, wherein the retrieving the AR content associated with the at least one scene element is triggered by an audio cue received from a user accessing the AR environment, the audio cue indicating that the at least one scene element is interactive.

4. The method of claim 1, further comprising updating the semantic graph to include the modified UI layout pattern for the at least one scene element in response to determining the context corresponding to the at least one scene element is associated with the different relationship.

5. The method of claim 1, wherein the AR content is first AR content, the method further comprising:

providing, by the computing device, second AR content according to the modified UI layout pattern on an additional scene element and according to the different relationship.

6. The method of claim 1, wherein:
retrieving the information about the at least one real-world object depicted within the AR environment is retrieved in response to the computing device recognizing the at least one real-world object, the information being retrieved from online sources based on a captured image of the at least one real-world object.

7. The method of claim 1, wherein the at least one scene element is three-dimensional and configured to present three-dimensional AR content in the AR environment.

8. The method of claim 1, wherein each relationship from the plurality of relationships indicates at least a placement indication and a scale indication for a corresponding scene element.

9. The method of claim 1, wherein the plurality of relationships between the plurality of scene elements each indicate at least one opinion for associating the UI layout pattern with the at least one scene element.

10. The method of claim 9, wherein the display of the plurality of scene elements in the AR environment is based at least in part on the at least one opinion.

11. A computer program product tangibly embodied on a non-transitory computer-readable medium and comprising instructions that, when executed, are configured to cause at least one processor to:
receive, by a computing device, data defining an augmented reality (AR) environment including a representation of a physical environment;
present an affordance associated with at least one real-world object depicted in the AR environment, the at least one real-world object and the affordance being included in a plurality of scene elements; and
in response to selection of the affordance, retrieve AR content associated with at least one scene element from the plurality of scene elements and associated with information retrieved about the at least one real-world object, retrieving the AR content including:
identify, for the at least one scene element, at least one relationship that corresponds to a UI layout pattern, the UI layout pattern including a semantic graph including a plurality of nodes and a plurality of edges corresponding with the plurality of scene elements and a plurality of relationships between the plurality of scene elements, the affordance providing functionality to access the AR content based on the semantic graph;
generate a modified UI layout pattern for the at least one scene element using a different relationship than the identified at least one relationship based on determining that a context corresponding to the at least one scene element is associated with the different relationship; and
trigger, by the computing device, display of the AR content associated with the information in place of the affordance and display of the at least one scene element using the modified UI layout pattern.

12. The computer program product of claim 11, wherein the retrieving the AR content associated with the at least one scene element is triggered by an audio cue received from a user accessing the AR environment, the audio cue indicating that the at least one scene element is interactive.

13. The computer program product of claim 11, wherein the instructions are further configured to cause the at least one processor to update the semantic graph to include the modified UI layout pattern for the at least one scene element, in response to determining the context corresponding to the at least one scene element is associated with the different relationship.

14. The computer program product of claim 11, wherein the at least one scene element is three-dimensional and configured to present three-dimensional AR content in the AR environment.

15. A system comprising:
memory; and
at least one processor coupled to the memory, the at least one processor being configured to:
receive, by a computing device, data defining an augmented reality (AR) environment including a representation of a physical environment;
present an affordance associated with at least one real-world object depicted in the AR environment, the at least one real-world object and the affordance being included in a plurality of scene elements;
receive an indication of selection of the affordance;
in response to the selection of the affordance, identify, for the at least one real-world object, at least one relationship that corresponds to a UI layout pattern from a set of UI layout patterns, the UI layout pattern including a semantic graph including a plurality of nodes and a plurality of edges corresponding with the plurality of scene elements and a plurality of relationships between the plurality of scene elements, the affordance providing functionality to access AR content based on the semantic graph;
generate a modified UI layout pattern, including an updated semantic graph, for the at least one real-world object using a different relationship than the identified at least one relationship based on determining that a context corresponding to the at least one real-world object is associated with the different relationship;
the updated semantic graph being associated with pre-defined rules and relationships including additional UI content nodes representing the AR content and additional edges to arrange the AR content corresponding with the different relationship; and
trigger, by the computing device and in place of the affordance, display of AR content associated with the at least one real-world object based on the updated semantic graph for the modified UI layout pattern.

16. The system of claim 15, wherein each relationship from the plurality of relationships indicates at least a placement indication and a scale indication for a corresponding scene element.

17. The system of claim 15, wherein the plurality of relationships between a plurality of scene elements each indicate at least one opinion for associating the UI layout pattern with the at least one scene element.

18. The system of claim 17, wherein the display of the plurality of scene elements in the AR environment is based at least in part on the at least one opinion.

19. The method of claim 1, wherein the plurality of relationships includes at least one of an adjacent relationship, a co-planar relationship, or a scaled to relationship.

* * * * *

UNITED STATES PATENT AND TRADEMARK OFFICE
CERTIFICATE OF CORRECTION

| | |
|---|---|
| PATENT NO. | : 11,609,675 B2 |
| APPLICATION NO. | : 16/700359 |
| DATED | : March 21, 2023 |
| INVENTOR(S) | : Murphy et al. |

It is certified that error appears in the above-identified patent and that said Letters Patent is hereby corrected as shown below:

In the Claims

In Column 32, Claim 1, Line 21, after "object" delete "and the affordance".

In Column 32, Claim 1, Line 30, delete "sematic" and insert -- semantic --, therefor.

In Column 32, Claim 1, Line 37, delete "pattern" and insert -- pattern, including an updated semantic graph, --, therefor.

In Column 32, Claim 1, Line 42, delete "relationship; and" and insert -- relationship, --, therefor.

In Column 32, Claim 1, Line 42, after "relationship; and" insert -- the updated semantic graph being associated with predefined rules and relationships including additional UI content nodes representing the AR content and additional edges to arrange the AR content corresponding with the different relationship; and --.

In Column 32, Claim 1, Line 46, delete "using" and insert -- based on the updated semantic graph for --, therefor.

In Column 33, Claim 11, Line 35, after "object" delete "and the affordance".

In Column 33, Claim 11, Line 44, delete "sematic" and insert -- semantic --, therefor.

In Column 33, Claim 11, Line 51, delete "pattern" and insert -- pattern, including an updated semantic graph, --, therefor.

In Column 33, Claim 11, Line 56, delete "relationship; and" and insert -- relationship, --, therefor.

In Column 33, Claim 11, Line 56, after "relationship; and" insert -- the updated semantic graph being associated with predefined rules and relationships including additional UI content nodes representing Signed and Sealed this
Second Day of April, 2024

*Katherine Kelly Vidal*

Katherine Kelly Vidal
*Director of the United States Patent and Trademark Office*

CERTIFICATE OF CORRECTION (continued)
U.S. Pat. No. 11,609,675 B2 the AR content and additional edges to arrange the AR content corresponding with the different relationship; and --.

In Column 33, Claim 11, Line 60, delete "using" and insert -- based on the updated semantic graph for --, therefor.

In Column 34, Claim 15, Line 41, delete "relationship;" and insert -- relationship, --, therefor.